United States Patent
Tanaka et al.

(10) Patent No.: US 6,889,000 B2
(45) Date of Patent: May 3, 2005

(54) SIGNAL ENCODING APPARATUS, AUDIO DATA TRANSMITTING METHOD, AUDIO DATA RECORDING METHOD, AUDIO DATA DECODING METHOD AND AUDIO DISC

(75) Inventors: Yoshiaki Tanaka, Fujisawa (JP); Norihiko Fuchigami, Yamato (JP); Shoji Ueno, Fujisawa (JP)

(73) Assignee: Victor Co. of Japan, Ltd. (JP)

( * ) Notice: Subject to any disclaimer, the term of this patent is extended or adjusted under 35 U.S.C. 154(b) by 39 days.

(21) Appl. No.: 10/423,561

(22) Filed: Apr. 25, 2003

(65) Prior Publication Data

US 2004/0013411 A1 Jan. 22, 2004

Related U.S. Application Data

(62) Division of application No. 09/238,727, filed on Jan. 28, 1999, now Pat. No. 6,560,403.

(30) Foreign Application Priority Data

Jan. 30, 1998 (JP) .............................................. 10-34179
Mar. 5, 1998 (JP) .............................................. 10-71276

(51) Int. Cl.⁷ .................................................. H04N 5/91
(52) U.S. Cl. ........................ 386/95; 386/104; 386/386; 386/126
(58) Field of Search ............................. 386/46, 95, 98, 386/96, 104, 111, 125, 126; 369/275.3

(56) References Cited

U.S. PATENT DOCUMENTS 6,072,759 A   6/2000  Maeda et al.
6,134,383 A  10/2000  Kikuchi et al.
6,208,802 B1 * 3/2001 Mori et al. .................... 386/96
6,222,983 B1   4/2001 Heo
6,560,403 B1 * 5/2003 Tanaka et al. ................. 386/95

FOREIGN PATENT DOCUMENTS

JP           8-273304          10/1996

OTHER PUBLICATIONS

"DVD–Audio Format" By E. Funasaka et al; An Audio Engineering Society Reprint; Sep., 1997; pp. 1–8.
"Outline of DVD Standard" By M. Moriya et al; National Technical Report vol. 43, No. 3, Jun., 1997; pp 3–9.

* cited by examiner

*Primary Examiner*—Huy Nguyen
(74) *Attorney, Agent, or Firm*—Anderson Kill & Olick, PC

(57) ABSTRACT

A format of data recorded in a DVD-Audio disc is composed of an audio manager (AMG) and a plurality of audio title sets (ATSs) following the AMG. A plurality of audio packs are arranged in each ATS. An audio signal indicating a musical composition is encoded to audio data in a signal processing circuit, and the audio data is arranged in the audio packs. The audio data of the audio packs are formatted in a DVD formatting unit with the AMG to be arranged in the ATSs following the AMG. Also, copyright information is arranged in an area of a control data block placed in a read-in area of the DVD-Audio disc. Table-of-contents (TOC) information indicating a top address of the audio data is automatically produced and is arranged in an empty area of the control data block reserved for the copyright information, in an area of the audio packs, in an area of the AMG or in an area of the ATSs. The AMG, the ATSs including the audio packs and the TOC information arranged at the data format in the DVD formatting unit are transmitted to a human editor through a transmission medium and is recorded in the DVD-Audio disc.

3 Claims, 34 Drawing Sheets

AUDIO CHARACTER DISPLAY INFORMATION (ACD)

| GENERAL INFORMATION | 48 BYTES | |
|---|---|---|
| | C1 | C2 |
| NAME SPACE | 93 | 93 |
| FREE SPACE 1 | 93 | 93 |
| FREE SPACE 2 | 93 | 93 |
| DATA POINTER | 15 | 15 |
| (SUMMATION) | (294 BYTES) | (294 BYTES) |

FIG. 6

DISPLAY EXAMPLE

|←— 15 FULL-SIZED CHARACTERS ——→|
|←——— 31 HALF-SIZED CHARACTERS ———→|

0.5 LINE

2 LINES

COMMENTS ON MUSIC

ENDING MUSIC OF PREVIOUS WORK
"FORGET-ME-NOT"

FIG. 7

AUDIO SEARCH DATA (ASD)

| | |
|---|---|
| GENERAL INFORMATION | 16 BYTES |
| CURRENT NUMBER INFORMATION | 8 BYTES |
| CURRENT DATE AND TIME INFORMATION | 16 BYTES |
| TITLE SET SEARCH INFORMATION | 8 BYTES |
| TITLE SEARCH INFORMATION | 8 BYTES |
| TRACK SEARCH INFORMATION | 404 BYTES |
| INDEX SEARCH INFORMATION | 408 BYTES |
| HIGHLIGHT SEARCH INFORMATION | 80 BYTES |
| RESERVED AREA | 52 BYTES |

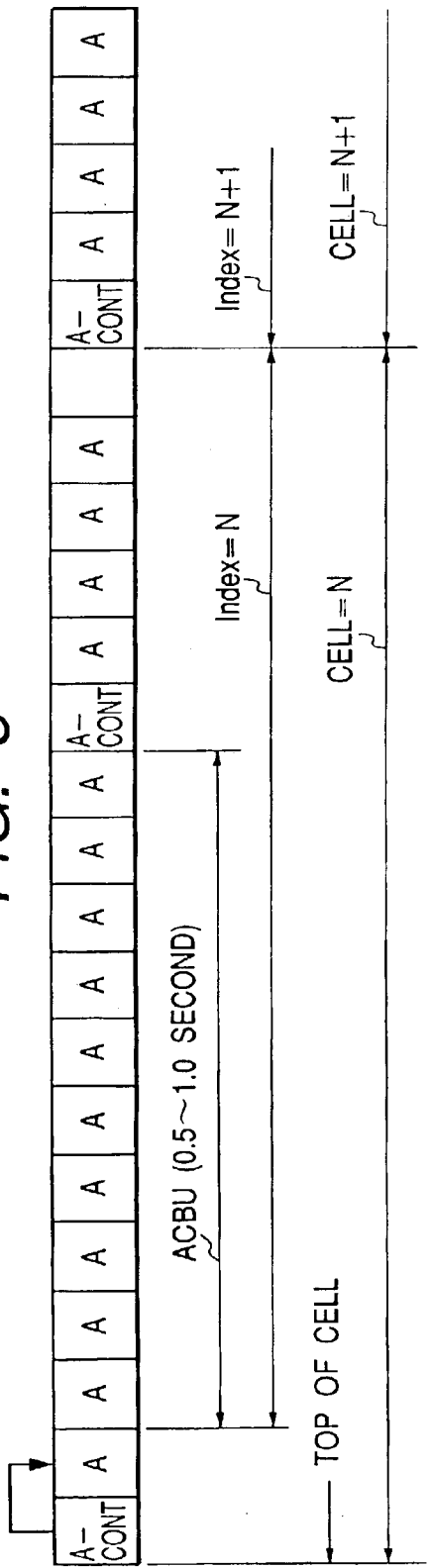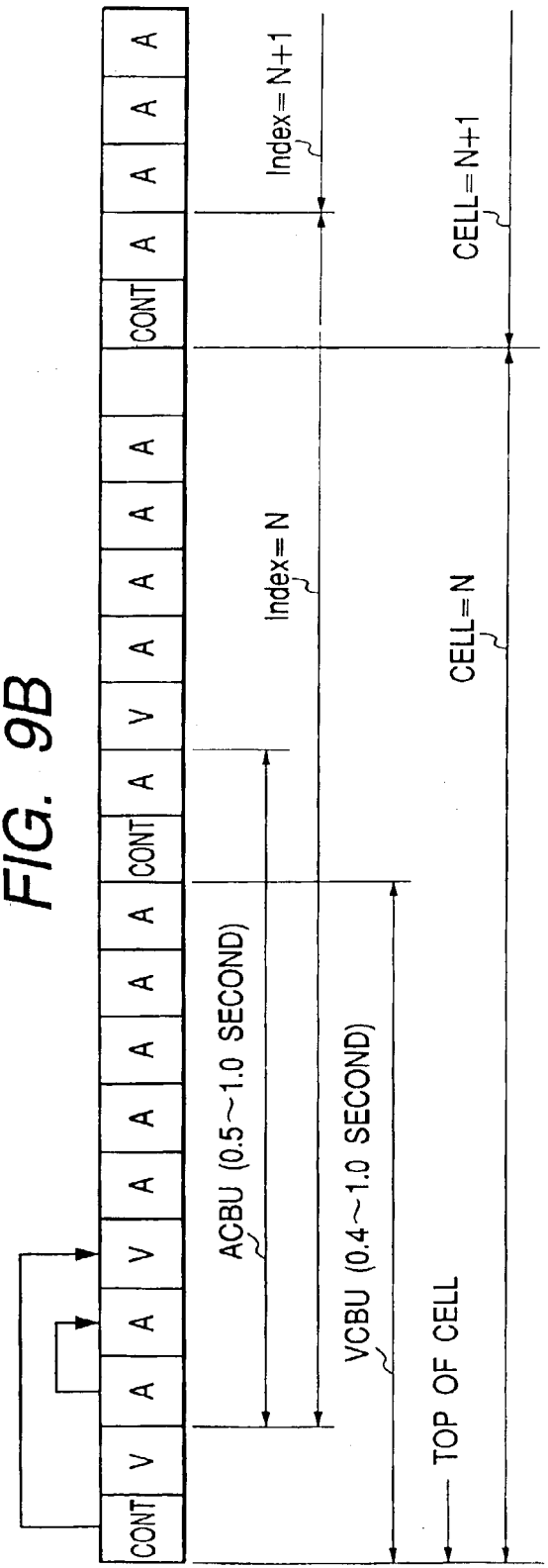

FIG. 10

AUDIO CHARACTER DISPLAY (ACD) INFORMATION

| GENERAL INFORMATION | 48 BYTES |
|---|---|
| NAME SPACE | 93 BYTES |
| FREE SPACE 1 | 93 BYTES |
| FREE SPACE 2 | 93 BYTES |
| DATA POINTER | 15 BYTES |
| AUDIO PLAYBACK CONTROL INFORMATION | 294 BYTES |

FIG. 11

AUDIO SEARCH DATA (ASD)

| GENERAL INFORMATION | 16 BYTES |
|---|---|
| TITLE SET SEARCH INFORMATION | 8 BYTES |
| TITLE SEARCH INFORMATION | 8 BYTES |
| TRACK SEARCH INFORMATION | 404 BYTES |
| INDEX SEARCH INFORMATION | 408 BYTES |
| HIGHLIGHT SEARCH INFORMATION | 80 BYTES |
| RESERVED AREA | 76 BYTES |

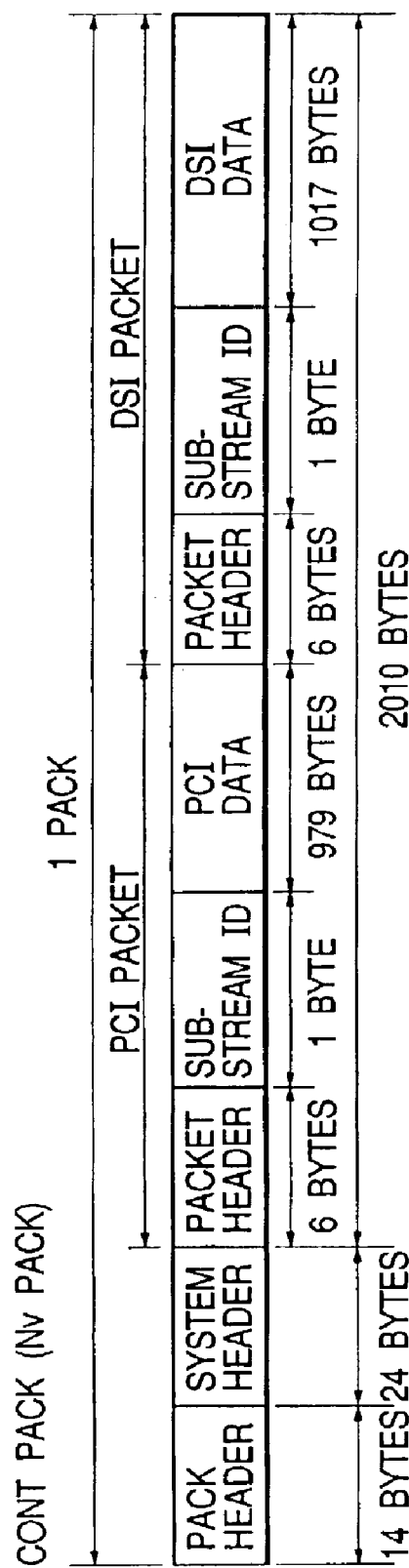

FIG. 14

PCI GENERAL INFORMATION (PCI GI)

| | |
|---|---|
| LBN OF NAVIGATION PACK (NV PCK LBN) | 4 BYTES |
| CATEGORY OF VOBU (VOBU CAT) | 2 BYTES |
| RESERVED AREA | 2 BYTES |
| USER OPERATION CONTROL INFORMATION (VOBU UOP CTL) | 4 BYTES |
| START PTM OF VOBU (VOBU S PTM) | 4 BYTES |
| END PTM OF VOBU (VOBU E PTM) | 4 BYTES |
| END PTM OF SEQUENCE END IN VOBU (VOBU SE E PTM) | 4 BYTES |
| ELAPSED TIME IN CELL (C ELTM) | 4 BYTES |
| RESERVED AREA | 32 BYTES |

FIG. 16

DSI DATA

| | |
|---|---|
| DSI GENERAL INFORMATION (DSI GI) | 32 BYTES |
| SEAMLESS PLAYBACK INFORMATION (SML PBI) | 148 BYTES |
| SEAMLESS ANGLE INFORMATION (SML AGLI) | 54 BYTES |
| VOBU SEARCH INFORMATION (VOBU SRI) | 168 BYTES |
| SYNCHRONIZATION INFORMATION (SYNCI) | 144 BYTES |
| RESERVED AREA | 471 BYTES |

FIG. 15

RECORDING INFORMATION (RECI)

| | |
|---|---|
| ISRC OF VIDEO DATA IN VIDEO STREAM (ISRC V) | 10 BYTES |
| ISRC OF AUDIO DATA IN DECODING AUDIO STREAM #0 (ISRC A0) | 10 BYTES |
| ISRC OF AUDIO DATA IN DECODING AUDIO STREAM #1 (ISRC A1) | 10 BYTES |
| ISRC OF AUDIO DATA IN DECODING AUDIO STREAM #2 (ISRC A2) | 10 BYTES |
| ISRC OF AUDIO DATA IN DECODING AUDIO STREAM #3 (ISRC A3) | 10 BYTES |
| ISRC OF AUDIO DATA IN DECODING AUDIO STREAM #4 (ISRC A4) | 10 BYTES |
| ISRC OF AUDIO DATA IN DECODING AUDIO STREAM #5 (ISRC A5) | 10 BYTES |
| ISRC OF AUDIO DATA IN DECODING AUDIO STREAM #6 (ISRC A6) | 10 BYTES |
| ISRC OF AUDIO DATA IN DECODING AUDIO STREAM #7 (ISRC A7) | 10 BYTES |
| ISRC OF SP DATA IN DECODING SP STREAM #0, #8, #16 OR #24 (ISRC SP0) | 10 BYTES |
| ISRC OF SP DATA IN DECODING SP STREAM #1, #9, #17 OR #25 (ISRC SP1) | 10 BYTES |
| ISRC OF SP DATA IN DECODING SP STREAM #2, #10, #18 OR #26 (ISRC SP2) | 10 BYTES |
| ISRC OF SP DATA IN DECODING SP STREAM #3, #11, #19 OR #27 (ISRC SP3) | 10 BYTES |
| ISRC OF SP DATA IN DECODING SP STREAM #4, #12, #20 OR #28 (ISRC SP4) | 10 BYTES |
| ISRC OF SP DATA IN DECODING SP STREAM #5, #13, #21 OR #29 (ISRC SP5) | 10 BYTES |
| ISRC OF SP DATA IN DECODING SP STREAM #6, #14, #22 OR #30 (ISRC SP6) | 10 BYTES |
| ISRC OF SP DATA IN DECODING SP STREAM #7, #15, #23 OR #31 (ISRC SP7) | 10 BYTES |
| GROUP OF SP STREAMS SELECTED FOR ISRC (ISRC SP SEL) | 1 BYTE |
| RESERVED AREA | 18 BYTES |

FIG. 17

DSI GENERAL INFORMATION (DSI GI)

| | |
|---|---|
| SCR BASE OF NAVIGATION CONTROL PACK (NV PCK SCR) | 4 BYTES |
| LBN OF NAVIGATION CONTROL PACK (NV PCK LBN) | 4 BYTES |
| END ADDRESS OF VOBU (VOBU EA) | 4 BYTES |
| END ADDRESS OF FIRST REFERENCE PICTURE OF VOBU (VOBU 1ST REF EA) | 4 BYTES |
| END ADDRESS OF SECOND REFERENCE PICTURE OF VOBU (VOBU 2ND REF EA) | 4 BYTES |
| END ADDRESS OF THIRD REFERENCE PICTURE OF VOBU (VOBU 3RD REF EA) | 4 BYTES |
| VOB ID NUMBER OF VOBU (VOBU VOB IDN) | 2 BYTES |
| RESERVED AREA | 1 BYTE |
| CELL ID NUMBER OF VOBU (VOBU C IDN) | 1 BYTE |
| CELL ELAPSED TIME (C ELTM) | 4 BYTES |

FIG. 18

SEAMLESS PLAYBACK INFORMATION (SML PBI)

| | |
|---|---|
| CATEGORY OF SEAMLESS VOBU (VOBU SML CAT) | 2 BYTES |
| END ADDRESS OF INTER-LEAVED UNIT (ILVU EA) | 4 BYTES |
| START ADDRESS OF NEXT INTER-LEAVED UNIT (NXT ILVU SA) | 4 BYTES |
| SIZE OF NEXT INTER-LEAVED UNIT (NXT ILVU SZ) | 2 BYTES |
| START PTM OF VIDEO IN VOB (VOB V S PTM) | 4 BYTES |
| END PTM OF VIDEO IN VOB (VOB V E PTM) | 4 BYTES |
| END PTM OF AUDIO IN VOB (VOB A STP PTM) | 8 BYTES×8 |
| GAP LENGTH OF AUDIO IN VOB (VOB A GAP LEN) | 8 BYTES×8 |

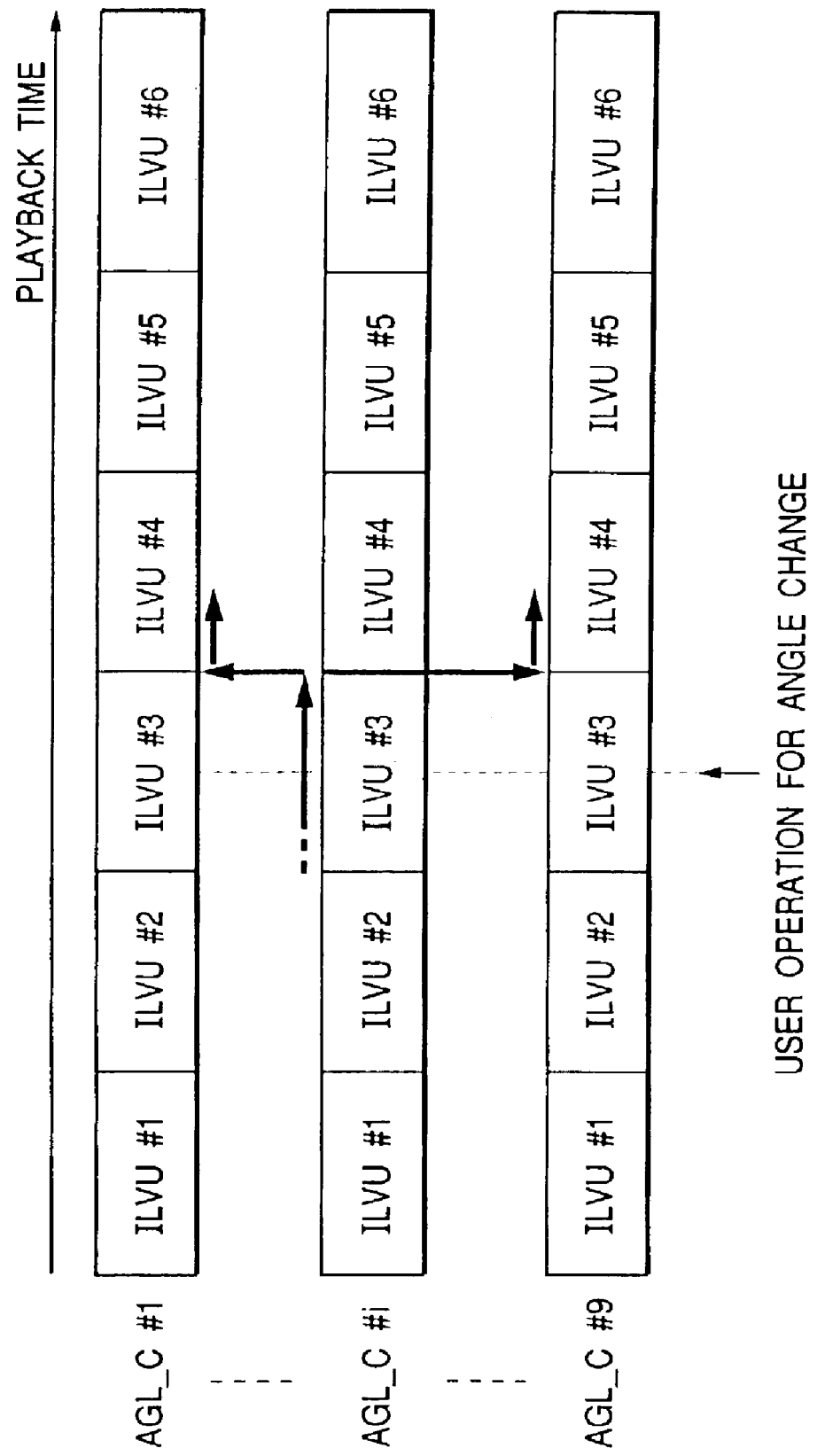

FIG. 21
VOBU SEARCH INFORMATION (VOBU-SRI)

| | |
|---|---|
| HEAD ADDRESS OF NEXT VOBU HAVING VIDEO DATA (WDI_VIDEO) | 4 BYTES |
| +240 VOBU HEAD ADDRESS AND VIDEO EXISTENCE FLAG (FWDI 240) | 4 BYTES |
| +120 VOBU HEAD ADDRESS AND VIDEO EXISTENCE FLAG (FWDI 120) | 4 BYTES |
| +60 VOBU HEAD ADDRESS AND VIDEO EXISTENCE FLAG (FWDI 60) | 4 BYTES |
| +20 VOBU HEAD ADDRESS AND VIDEO EXISTENCE FLAG (FWDI 20) | 4 BYTES |
| +15 VOBU HEAD ADDRESS AND VIDEO EXISTENCE FLAG (FWDI 15) | 4 BYTES |
| +14 VOBU HEAD ADDRESS AND VIDEO EXISTENCE FLAG (FWDI 14) | 4 BYTES |
| +13 VOBU HEAD ADDRESS AND VIDEO EXISTENCE FLAG (FWDI 13) | 4 BYTES |
| +12 VOBU HEAD ADDRESS AND VIDEO EXISTENCE FLAG (FWDI 12) | 4 BYTES |
| +11 VOBU HEAD ADDRESS AND VIDEO EXISTENCE FLAG (FWDI 11) | 4 BYTES |
| +10 VOBU HEAD ADDRESS AND VIDEO EXISTENCE FLAG (FWDI 10) | 4 BYTES |
| +9 VOBU HEAD ADDRESS AND VIDEO EXISTENCE FLAG (FWDI 9) | 4 BYTES |
| +8 VOBU HEAD ADDRESS AND VIDEO EXISTENCE FLAG (FWDI 8) | 4 BYTES |
| +7 VOBU HEAD ADDRESS AND VIDEO EXISTENCE FLAG (FWDI 7) | 4 BYTES |
| +6 VOBU HEAD ADDRESS AND VIDEO EXISTENCE FLAG (FWDI 6) | 4 BYTES |
| +5 VOBU HEAD ADDRESS AND VIDEO EXISTENCE FLAG (FWDI 5) | 4 BYTES |
| +4 VOBU HEAD ADDRESS AND VIDEO EXISTENCE FLAG (FWDI 4) | 4 BYTES |
| +3 VOBU HEAD ADDRESS AND VIDEO EXISTENCE FLAG (FWDI 3) | 4 BYTES |
| +2 VOBU HEAD ADDRESS AND VIDEO EXISTENCE FLAG (FWDI 2) | 4 BYTES |
| +1 VOBU HEAD ADDRESS AND VIDEO EXISTENCE FLAG (FWDI 1) | 4 BYTES |
| NEXT VOBU HEAD ADDRESS AND VIDEO EXISTENCE FLAG (FWDI Next) | 4 BYTES |
| PREVIOUS VOBU HEAD ADDRESS AND VIDEO EXISTENCE FLAG (BWDI Prev) | 4 BYTES |
| −1 VOBU HEAD ADDRESS AND VIDEO EXISTENCE FLAG (BWDI 1) | 4 BYTES |
| −2 VOBU HEAD ADDRESS AND VIDEO EXISTENCE FLAG (BWDI 2) | 4 BYTES |
| −3 VOBU HEAD ADDRESS AND VIDEO EXISTENCE FLAG (BWDI 3) | 4 BYTES |
| −4 VOBU HEAD ADDRESS AND VIDEO EXISTENCE FLAG (BWDI 4) | 4 BYTES |
| −5 VOBU HEAD ADDRESS AND VIDEO EXISTENCE FLAG (BWDI 5) | 4 BYTES |
| −6 VOBU HEAD ADDRESS AND VIDEO EXISTENCE FLAG (BWDI 6) | 4 BYTES |
| −7 VOBU HEAD ADDRESS AND VIDEO EXISTENCE FLAG (BWDI 7) | 4 BYTES |
| −8 VOBU HEAD ADDRESS AND VIDEO EXISTENCE FLAG (BWDI 8) | 4 BYTES |
| −9 VOBU HEAD ADDRESS AND VIDEO EXISTENCE FLAG (BWDI 9) | 4 BYTES |
| −10 VOBU HEAD ADDRESS AND VIDEO EXISTENCE FLAG (BWDI 10) | 4 BYTES |
| −11 VOBU HEAD ADDRESS AND VIDEO EXISTENCE FLAG (BWDI 11) | 4 BYTES |
| −12 VOBU HEAD ADDRESS AND VIDEO EXISTENCE FLAG (BWDI 12) | 4 BYTES |
| −13 VOBU HEAD ADDRESS AND VIDEO EXISTENCE FLAG (BWDI 13) | 4 BYTES |
| −14 VOBU HEAD ADDRESS AND VIDEO EXISTENCE FLAG (BWDI 14) | 4 BYTES |
| −15 VOBU HEAD ADDRESS AND VIDEO EXISTENCE FLAG (BWDI 15) | 4 BYTES |
| −20 VOBU HEAD ADDRESS AND VIDEO EXISTENCE FLAG (BWDI 20) | 4 BYTES |
| −60 VOBU HEAD ADDRESS AND VIDEO EXISTENCE FLAG (BWDI 60) | 4 BYTES |
| −120 VOBU HEAD ADDRESS AND VIDEO EXISTENCE FLAG (BWDI 120) | 4 BYTES |
| −240 VOBU HEAD ADDRESS AND VIDEO EXISTENCE FLAG (BWDI 240) | 4 BYTES |
| HEAD ADDRESS OF PREVIOUS VOBU HAVING VIDEO DATA (BWDI_Video) | 4 BYTES |

FIG. 22

SYNCHRONIZATION INFORMATION (SYNCI)

| ADDRESS OF AUDIO PACK (A PCK)<br>(A SYNCA 0 TO 7) | 2 BYTES×8 |
|---|---|
| VOBU HEAD ADDRESS FOR SUB-PICTURE PACK (SP PCK)<br>(SP SYNCA 0 TO 31) | 4 BYTES×32 |

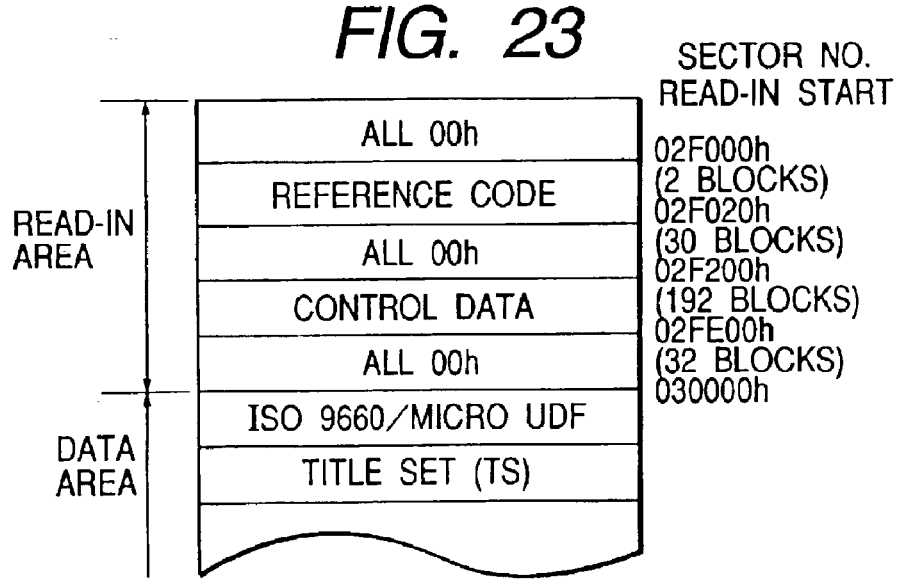

FIG. 23

| READ-IN AREA | ALL 00h | SECTOR NO. READ-IN START<br>02F000h<br>(2 BLOCKS) |
| | REFERENCE CODE | 02F020h<br>(30 BLOCKS) |
| | ALL 00h | 02F200h<br>(192 BLOCKS) |
| | CONTROL DATA | 02FE00h<br>(32 BLOCKS) |
| | ALL 00h | 030000h |
| DATA AREA | ISO 9660/MICRO UDF | |
| | TITLE SET (TS) | |

FIG. 24

CONTROL DATA BLOCK

| SECTOR NO. | |
|---|---|
| 0 | PHYSICAL FORMAT INFORMATION |
| 1 | DISC PRODUCTION INFORMATION |
| 2 | COPYRIGHT INFORMATION |
| 3 | |
| ... | |
| 15 | |

PHYSICAL FORMAT INFORMATION (2048 BYTES)

| BYTE NO. | CONTENTS | |
|---|---|---|
| 0 | BOOK TYPE, PART VERSION | 1 BYTE |
| 1 | DISC SIZE, MINIMUM READ-OUT RATE | 1 BYTE |
| 2 | DISC STRUCTURE | 1 BYTE |
| 3 | RECORDING DENSITY | 1 BYTE |
| 4~15 | DATA AREA ALLOCATION (START ADDRESS : 030000h, END ADDRESS : xxxxxx) | 12 BYTES |
| 16~2047 | | 2032 BYTES |

FIG. 27A

TOC INFORMATION

| | |
|---|---|
| SIMPLE AUDIO PLAY POINTER TABLE INFORMATION (SAPP TI) | 16 BYTES |
| SIMPLE AUDIO PLAY POINTER #1 (SAPP #1) | 48 BYTES |
| ⋮ | |
| SIMPLE AUDIO PLAY POINTER #n (SAPP #n) | 48 BYTES |

FIG. 27B

SAPP

| | |
|---|---|
| GROUP OF SAPP | 1 BYTE |
| TRACK NUMBER OF SAPP | 1 BYTE |
| START PRESENTATION TIME OF THE FIRST CELL IN THE TRACK POINTED BY SAPP | 4 BYTES |
| PLAYBACK TIME OF THE TRACK POINTED BY SAPP | 4 BYTES |
| PAUSE TIME OF THE TRACK POINTED BY SAPP | 4 BYTES |
| ATTRIBUTE OF THE TRACK POINTED BY SAPP (SAPP-ATR) | 4 BYTES |
| RESERVED AREA | 18 BYTES |
| START ADDRESS OF THE TRACK POINTED BY SAPP | 4 BYTES |
| START ADDRESS OF THE FIRST CELL OF THE TRACK POINTED BY SAPP | 4 BYTES |
| END ADDRESS OF THE TRACK POINTED BY SAPP | 4 BYTES |

FIG. 27C

SAPP

| | |
|---|---|
| TITLE NUMBER OF SAPP | 1 BYTE |
| TRACK NUMBER OF SAPP | 1 BYTE |
| START PRESENTATION TIME OF THE FIRST CELL IN THE TRACK POINTED BY SAPP | 4 BYTES |
| PLAYBACK TIME OF THE TRACK POINTED BY SAPP | 4 BYTES |
| PAUSE TIME OF THE TRACK POINTED BY SAPP | 4 BYTES |
| ATTRIBUTE OF THE TRACK POINTED BY SAPP (SAPP-ATR) | 4 BYTES |
| RESERVED AREA | 18 BYTES |
| START ADDRESS OF THE TRACK POINTED BY SAPP | 4 BYTES |
| START ADDRESS OF THE FIRST CELL OF THE TRACK POINTED BY SAPP | 4 BYTES |
| END ADDRESS OF THE TRACK POINTED BY SAPP | 4 BYTES |

FIG. 28

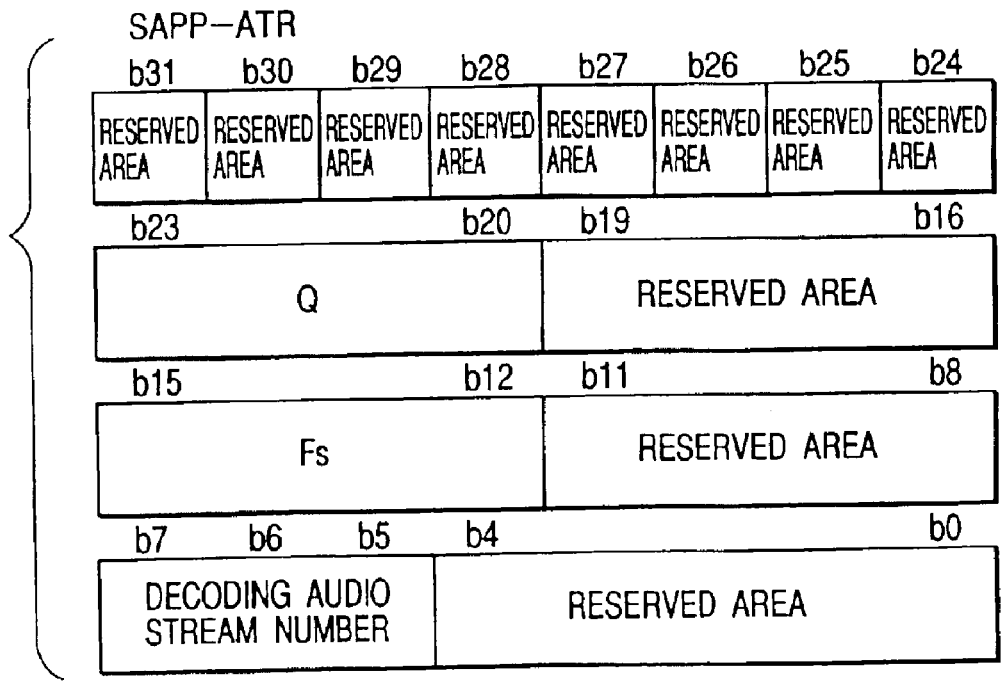

HEADER

SIGNAL ENCODING APPARATUS, AUDIO DATA TRANSMITTING METHOD, AUDIO DATA RECORDING METHOD, AUDIO DATA DECODING METHOD AND AUDIO DISC

This is a divisional application of application Ser. No. 09/238,727, filed Jan. 28, 1999, now U.S. Pat. No. 6,560,403.

BACKGROUND OF THE INVENTION

1. Field of the Invention

The present invention relates to a signal encoding apparatus for encoding an audio signal or audio and video signals to audio data or audio/video data to be recorded in an audio recording medium, an audio data transmitting method for transmitting the audio data encoded in the encoding apparatus through a transmission medium, an audio data recording method for recording the audio data transmitted according to the audio data transmitting method in the audio disc, audio data decoding method for decoding the audio data transmitted according to the audio data transmitting method, and an audio disc for recording audio data to be read out from its top position.

2. Description of the Related Art

2.1. Previously Proposed Art

A conventional compact disc (CD) has been known as a conventional audio signal playback optical disc. Also, a digital video disc (or a digital versatile disc) (DVD) has been recently known as an optical disc having a packing density higher than that of the CD. The digital video disc is called DVD-video disc in this specification.

Also, a DVD-Audio disc has been recently known as an optical disc for music.

2.2. Problems to be Solved by the Invention

However, in cases where both a video signal (or video data) and an audio signal (or audio data) are recorded in the same DVD-video disc, the video signal is primarily recorded in the DVD-video disc, and the recording of the audio signal is subordinated to the recording of the video signal. Therefore, there are following problems.

First, the audio signal is integrated with the video signal in the DVD-video disc, so that the audio signal and the video signal are recorded as a set. Therefore, a memory capacity for the audio signal is considerably lower than that for the video signal.

Secondly, a time management for the audio signal cannot be performed independent of the video signal.

Thirdly, simple text information such as a music name cannot be read out from the DVD-video disc.

Also, because users, who are entertained with music obtained by playing back the audio signal, desire the DVD-video disc to be used for various purposes as compared with users entertained with a picture relating to the video signal, a simple audio play method is required of the DVD-video disc. For example, the users for the audio signal desires to arrange an area of table-of-contents (TOC) in the DVD-video disc in the same manner as in the CD. However, in the DVD-video disc, a video contents block unit is composed of a navigation control pack (called a CONT pack), a plurality of video (V) packs and a plurality of audio (A) packs, and the playback of the video and audio packs is controlled by using the CONT pack. Therefore, even though a user intends to primarily record the audio signal in the DVD-video disc independence of the video signal, a user cannot easily play back the audio signal, so that there is a problem that the DVD-video disc is not very useful for the user.

Also, the time management in the DVD-video disc is performed for each video frame. Therefore, even though a user intends to primarily record the audio signal in the DVD-video disc independence of the video signal, because it is important to continuously play back the audio signal as compared with the video signal, there is a problem that it is difficult to perform a time management for the audio signal in real time.

Also, in cases where a musical composition is recorded in a DVD-Audio disc, when the musical composition is played back, users desire that the musical composition is easily played back from its top position. Also, it is convenient for users that the DVD-Audio disc is compatible with the DVD-video disc.

SUMMARY OF THE INVENTION

A first object of the present invention is to provide a signal encoding apparatus in which an audio signal or audio and video signals are encoded to audio data or audio/video data to be primarily recorded in an audio disc and to be easily read out from the audio disc according to TOC (table-of-contents) information recorded in the audio disc.

A second object of the present invention is to provide an audio data transmitting method in which audio data (or an audio signal) is transmitted to a human editor to be primarily recorded in an audio disc.

A third object of the present invention is to provide an audio data recording method in which audio data (or an audio signal) transmitted to a human editor is recorded in an audio disc to be primarily recorded.

A fourth object of the present invention is to provide an audio data decoding method in which audio data transmitted to a human editor is decoded to be primarily recorded in an audio disc.

A fifth object of the present invention is to provide an audio disc in which audio data of a musical composition (or a movement of a symphony) is recorded to be easily played back from the top position of the musical composition.

A sixth object of the present invention is to provide an audio data transmitting method in which audio data of a musical composition (or a movement of a symphony) is transmitted through a recording medium or a transmission medium to be easily played back from the top position of the musical composition.

The first object is achieved by the provision of a signal encoding apparatus, comprising:

signal encoding means for encoding a signal to produce audio data, audio title set information and table-of-contents (TOC) information;

formatting means for formatting the audio data produced by the signal processing means, audio manager information and audio title set information to arrange the audio data in an audio pack, to arrange the audio manager information in an area of an audio manager and to arrange the audio title set information in an area of an audio title set, and arranging table-of-contents (TOC) information in an area reserved for copyright information which is arranged in a control data block provided according to a DVD-ROM standard, in the audio pack, in the area of the audio manager, in a table-of-contents (TOC) file or in the area of the audio title set; and outputting means for outputting the audio data, the audio manager information, the audio title set information and the table-of-contents (TOC) information formatted by the formatting means.

In the above configuration, audio data is produced by encoding a signal in the signal encoding means. Thereafter, the audio data is arranged in an audio pack, audio manager information is arranged in an area of an audio manager, audio title set information is arranged in an area of an audio title set, and table-of-contents (TOC) information is arranged in an area reserved for copyright information which is arranged in a control data block provided according to a DVD-ROM standard, in the audio pack, in the area of the audio manager, in a table-of-contents (TOC) file or in the area of the audio title set. The TOC information denotes information of a title, information of a start address of the audio data, information of a music play time and the like. Therefore, the audio data, the audio manager information, the audio title set information and the TOC information are formatted. Thereafter, the audio data, the audio manager information, the audio title set information and the TOC information are output.

Accordingly, in cases where the audio data is primarily recorded in an audio disc such as a DVD-ROM-audio disc, a DVD-ROM-Van disc or a DVD-ROM-audio disc type 2, because the table-of-contents (TOC) information is arranged in an area reserved for copyright information, in the audio pack, in the area of the audio manager, in the table-of-contents (TOC) file or in the area of the audio title set, the audio data can be easily read out from the audio disc according to the TOC information.

The second object is achieved by the provision of an audio data transmitting method, comprising the steps of:

preparing audio data, audio manager information, audio title set information and table-of-contents (TOC) information;

formatting the audio data, the audio manager information, the audio title set information and the table-of-contents (TOC) information to arrange the audio data in an audio pack, to arrange the audio manager information in an area of an audio manager, to arrange the audio title set information in an area of an audio title set and to arrange the table-of-contents (TOC) information in an area reserved for copyright information which is arranged in a control data block formatted according to a DVD-ROM standard, in the audio pack, in the area of the audio manager, in a table-of-contents (TOC) file or in the area of the audio title set; and transmitting the audio data, the audio manager information, the audio title set information and the table-of-contents (TOC) information through a transmission medium.

In the above steps, the audio data, the audio manager information, the audio title set information and the TOC information are formatted and transmitted to a personal computer of a human editor through the transmission medium. Therefore, the human editor can primarily record the audio data in an audio disc such as a DVD-ROM-audio disc, a DVD-ROM-Van disc or a DVD-ROM-audio disc type 2.

Accordingly, because the table-of-contents (TOC) information is arranged in an area reserved for copyright information, in the audio pack, in the area of the audio manager, in the table-of-contents (TOC) file or in the area of the audio title set, the audio data can be easily read out from the audio disc according to the TOC information.

The third object is achieved by the provision of an audio data recording method, comprising the steps of:

preparing audio data, audio manager information, audio title set information and table-of-contents (TOC) information;

formatting the audio data, the audio manager information, the audio title set information and the table-of-contents (TOC) information to arrange the audio data in an audio pack, to arrange the audio manager information in an area of an audio manager, to arrange the audio title set information in an area of an audio title set and to arrange the table-of-contents (TOC) information in an area reserved for copyright information which is arranged in a control data block formatted according to a DVD-ROM standard, in the audio pack, in the area of the audio manager, in a table-of-contents (TOC) file or in the area of the audio title set;

transmitting the audio data, the audio manager information, the audio title set information and the table-of-contents (TOC) information through a transmission medium;

receiving the audio data, the audio manager information, the audio title set information and the table-of-contents (TOC) information through the transmission medium; and recording the audio data, the audio manager information, the audio title set information and the table-of-contents (TOC) information.

In the above steps, the audio data, the audio manager information, the audio title set information and the TOC information are formatted and transmitted to a personal computer of a human editor through the transmission medium. When the human editor receives the audio data, the audio manager information, the audio title set information and the TOC information, the human editor records the audio data, the audio manager information, the audio title set information and the TOC information.

Accordingly, in cases where the audio data is primarily recorded in an audio disc such as a DVD-ROM-audio disc,-a DVD-ROM-Van disc or a DVD-ROM-audio disc type 2, the audio data can be easily read out from the audio disc according to the TOC information.

The fourth object is achieved by the provision of an audio data decoding method, comprising the steps of:

preparing audio data, audio manager information, audio title set information, table-of-contents (TOC) information and a decoding program;

formatting the audio data, the audio manager information, the audio title set information, the table-of-contents (TOC) information and the decoding program to arrange the audio data in an audio pack, to arrange the audio manager information in an area of an audio manager, to arrange the audio title set information in an area of an audio title set and to arrange the table-of-contents (TOC) information in an area reserved for copyright information which is arranged in a control data block formatted according to a DVD-ROM standard, in the audio pack, in the area of the audio manager, in a table-of-contents (TOC) file or in the area of the audio title set;

transmitting the audio data, the audio manager information, the audio title set information, the table-of-contents (TOC) information and the decoding program through a transmission medium;

receiving the audio data, the audio manager information, the audio title set information, the table-of-contents (TOC) information and the decoding program through the transmission medium; and decoding the audio data, the audio manager information, the audio title set information and the table-of-contents (TOC) information according to the decoding program.

In the above steps, the audio data, the audio manager information, the audio title set information, the table-of-contents (TOC) information and the decoding program are formatted and transmitted to a personal computer of a human editor through the transmission medium. When the human editor receives the audio data, the audio manager information, the audio title set information, the table-of-contents (TOC) information and the decoding program, the audio data, the audio manager information, the audio title set information and the TOC information are decoded according to the decoding program. Therefore, the audio data, the audio manager information, the audio title set information and the TOC information can be recorded in a disc.

Accordingly, in cases where the audio data is primarily recorded in an audio disc such as a DVD-ROM-audio disc, a DVD-ROM-Van disc or a DVD-ROM-audio disc type 2, the audio data can be easily read out from the audio disc according to the TOC information.

The fifth object is achieved by the provision of an audio disc for recording data at a data format, the data format comprising:

an audio file, having a file name, for arranging audio data of a musical composition at an audio format; and a table-of-contents (TOC) file, having a file name, for arranging table-of-contents (TOC) information, which indicates a position of the audio data arranged in the audio file to play back the audio data from a top position of the musical composition, at a TOC format.

In the above configuration, when the audio data arranged in the audio file is played back by using an audio player, because a top position of the musical composition is specified according to the TOC information arranged in the table-of-contents (TOC) file, the audio data is played back from a top position of the musical composition.

Accordingly, the top position of the musical composition is easily specified, and a user can entertain the musical composition from its top position.

The sixth object is achieved by the provision of an audio data transmitting method, comprising the steps of:

arranging audio data of a musical composition at an audio format as an audio file;

arranging table-of-contents (TOC) information, which indicates a position of the audio data to play back the audio data from a top position of the musical composition, at a TOC format as a table-of-contents (TOC) file; and transmitting the audio data of the musical composition and the table-of-contents (TOC) information through a recording medium or a communication circuit to record the audio data arranged at the audio format and the table-of-contents (TOC) information arranged at the TOC format.

In the above steps, the audio data of the musical composition arranged at the audio format and the TOC information arranged at the TOC format are transmitted to a human editor through a recording medium or a communication circuit and are recorded in an audio disc. Because the TOC information indicates a position of the audio data, when the audio data is read out from the audio disc, a top position of the musical composition is specified according to the TOC information, and the audio data can be easily played back from a top position of the musical composition.

BRIEF DESCRIPTION OF THE DRAWINGS

The objects, features and advantages of the present invention will be apparent from the following description taken in conjunction with the accompanying drawings, in which:

FIG. 6 is an explanatory view showing an example of a music name displayed according to information arranged in a name space area shown in FIG. 5;

FIG. 7 is an explanatory view showing in detail a format of an audio search data (ASD) area shown in FIG. 4 according to the first embodiment of the present invention;

FIG. 8 is an explanatory view showing an audio contents block unit (ACBU) shown in FIG. 1B and a video contents block unit (VCBU) shown in FIG. 1A according to a modification of the first embodiment of the present invention;

FIG. 9B is an explanatory view showing a video contents block unit (VCBU) shown in FIG. 9A;

FIG. 10 is an explanatory view showing in detail an area of audio character display (ACD) information arranged in a video manager (VMG) and/or a video title set (VTS) according to the second embodiment of the present invention;

FIG. 11 is an explanatory view showing in detail a format of an audio search data (ASD) area arranged in a video manager (VMG) and/or a video title set (VTS) according to the second embodiment of the present invention;

FIG. 12 is an explanatory view showing in detail a format of a navigation control pack (CONT pack) shown in FIG. 9;

FIG. 13 is an explanatory view showing in detail a configuration of PCI data shown in FIG. 12;

FIG. 14 is an explanatory view showing in detail a configuration of PCI general information (PCI GI) shown in FIG. 13;

FIG. 15 is an explanatory view showing in detail a configuration of record information (RECI) shown in FIG. 13;

FIG. 16 is an explanatory view showing in detail a configuration of data search information (DSI) shown in FIG. 12;

FIG. 17 is an explanatory view showing in detail a configuration of DSI general information (DSI GI) shown in FIG. 16;

FIG. 18 is an explanatory view showing in detail a configuration of seamless playback information (SML PBI) shown in FIG. 16;

FIG. 19 is an explanatory view showing in detail a configuration of seamless angle information (SML AGLI) shown in FIG. 16;

FIG. 21 is an explanatory view showing in detail a configuration of VOBU search information (VOBU SRI) shown in FIG. 16;

FIG. 22 is an explanatory view showing in detail a configuration of synchronization information (SYNCI) shown in FIG. 16;

FIG. 23 is an explanatory view showing a configuration of a recording area of a DVD;

FIG. 24 is an explanatory view showing a configuration of a control data block of a read-in area of the DVD shown in FIG. 23;

FIG. 27A is an explanatory view showing a configuration of TOC information recorded in an area (from the sector No. 8 to the sector No. 15) of copyright information shown in FIG. 24;

FIG. 27B is an explanatory view showing a configuration of each simple audio play pointer shown in FIG. 27A;

FIG. 27C is an explanatory view showing another configuration of each simple audio play pointer shown in FIG. 27A;

FIG. 28 is an explanatory view showing a format of a track attribute (SAPP-ATR) shown in FIG. 27B;

DETAILED DESCRIPTION OF THE EMBODIMENTS

Preferred embodiments of a data encoding apparatus, an audio data transmitting method, an audio data decoding method and an audio data recording method according to the present invention are described with reference to the drawings.

Figure 1A:
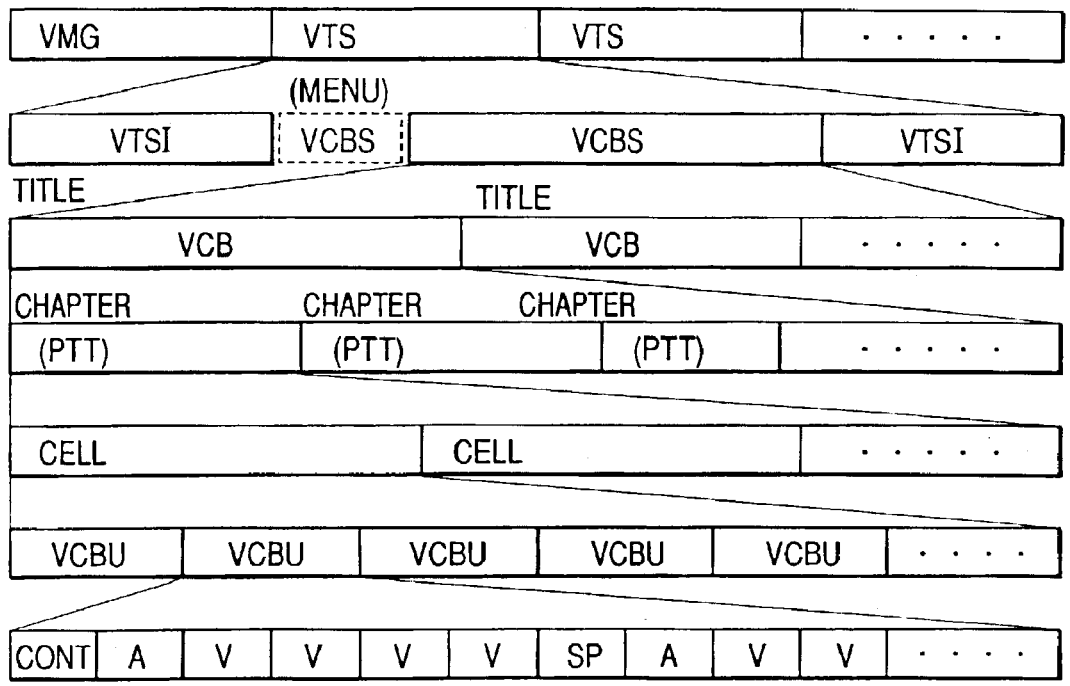
FIG. 1A is an explanatory view showing a fundamental format of data recorded on the basis of DVD video standards in a DVD-video disc according to a first embodiment of the present invention.
Figure 1B:
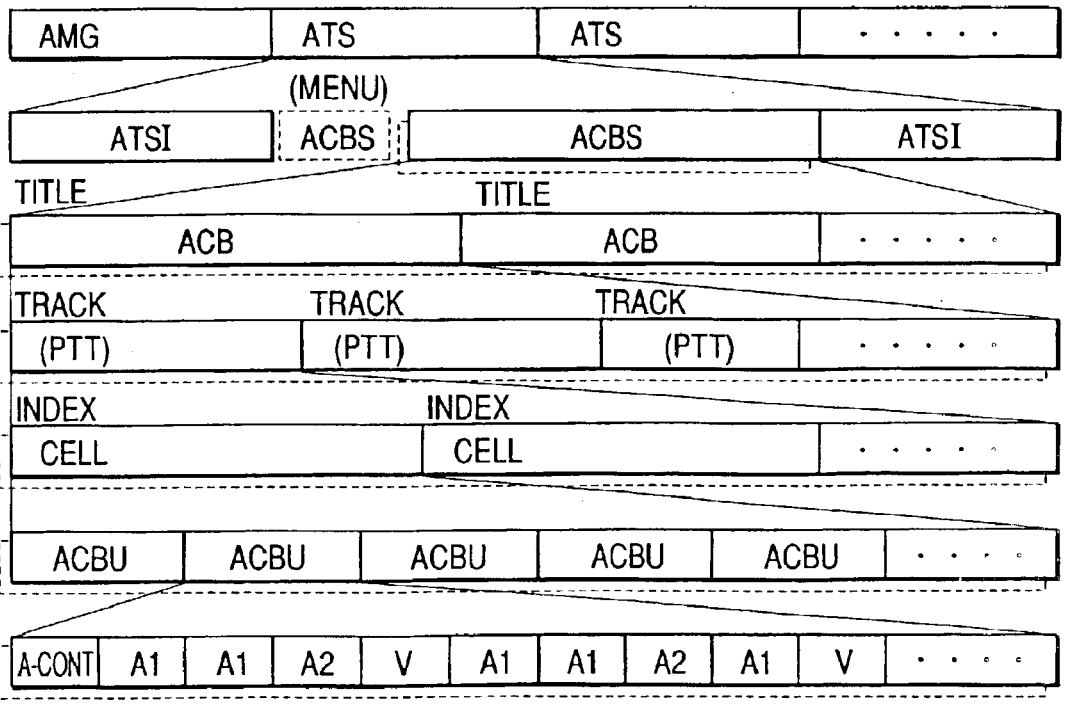
FIG. 1B is an explanatory view showing a fundamental format of data recorded in a DVD-Audio disc according to the first embodiment of the present invention.

FIG. 1A shows a fundamental format of data recorded in a DVD-video disc on the basis of DVD video standards according to a first embodiment of the present invention, and FIG. 1B shows a fundamental format of data recorded in a DVD-Audio disc according to the first embodiment of the present invention.

Though area names in a data format of the DVD-video disc differ from those in a data format of the DVD-Audio disc, the data formats are compatible with each other.

As shown in FIG. 1A and FIG. 1B, a format of data recorded in a DVD-video disc is composed of a video manager (VMG) placed at the top area of the DVD-video disc and a plurality of video title sets (VTS) following the VMG, and a format of data recorded in a DVD-Audio disc is composed of an audio manager (AMG) placed at the top area of the DVD-Audio disc and a plurality of audio title sets (ATS) following the AMG.

Each VMG includes video manager information (VMGI) for managing the video title sets (VTS).

Each VTS is composed of VTS information (VTSI) placed at the top area of the VTS, one or more video contents block sets (VCBS) following the VTSI and a VTS information (VTSI) placed at the final area of the VTS, and each ATS is composed of top ATS information (ATSI) placed in the top area of the ATS, one or more audio contents block sets (ACBS) and a final ATS information (ATSI) placed in the final area of the ATS. Contents of one musical composition (or contents of one movement of a symphony) is set in the area of each ACBS, and a music play time of the musical composition corresponding to each ACBS is set in the area of the top ATSI as a piece of table-of-contents (TOC) information.

Each VCBS is composed of a plurality of video contents block (VCB) respectively corresponding to one title of a video signal, and each VCB is composed of a plurality of chapters. Each chapter includes a part of title (PTT). Also, each ACBS (or called a title set) is composed of a plurality of audio contents blocks (ACB) respectively corresponding to one title of an audio signal, and each ACB is composed of a plurality of tracks corresponding to the chapters. Each track includes a part of title (PTT).

Each chapter is composed of a plurality of cells, each cell is composed of a plurality of VCB units (VCBU), and each VCBU is composed of a plurality of packs. Also, each track is composed of a plurality of indexes corresponding to the cells, each index is composed of a plurality of ACB units (ACBU) corresponding to the VCB units, and each ACBU is composed of a plurality of packs. Each pack of the ACBU is composed of 2048 bytes, and Each pack of the VCBU is composed of 2048 bytes.

The packs of the VCBU are classified into a navigation control pack (called a CONT pack) placed in the top area of the VCBU, a plurality of video (V) packs, a plurality of audio (A) packs and a plurality of sub-picture (SP) packs following the CONT pack. Also, the packs of the ACBU are classified into an audio-control pack (called an A-CONT pack) placed in the top area of the ACBU, a plurality of audio (A) packs and a plurality of video (V) packs following the A-CONT pack.

In the CONT pack, information for controlling the video packs following the CONT pack is arranged. In the A-CONT pack, information (for example, TOC information arranged in the CD) for managing an audio signal of the audio packs following the A-CONT pack is arranged. In each audio pack, audio data is arranged. In each video pack, video data and data (for example, closed caption (CC) data) other than the audio data are arranged.

Figure 2:
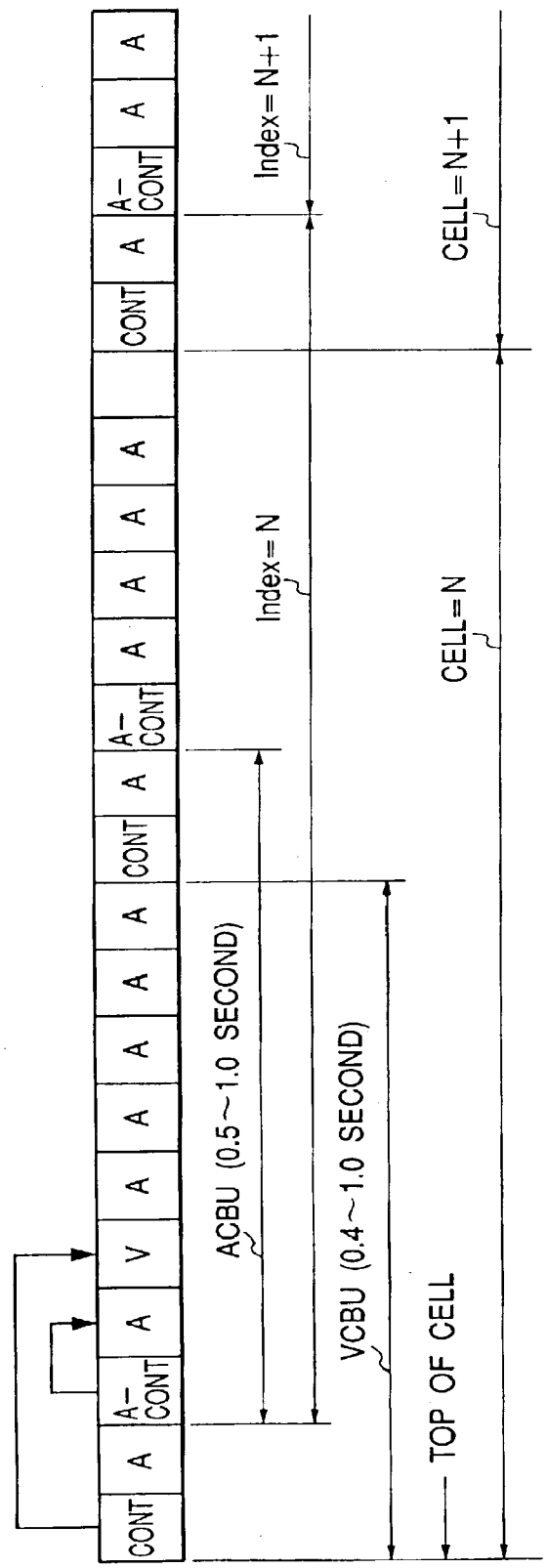
FIG. 2 is an explanatory view showing an audio contents block unit (ACBU) shown in FIG. 1B according to a first embodiment of the present invention.

FIG. 2 shows the audio contents block unit (ACBU) shown in FIG. 1B according to a first embodiment of the present invention.

As shown in FIG. 2, each video contents block unit (VCBU) is composed of a plurality of packs corresponding to a time period ranging from 0.4 to 1.0 second (the number of packs is arbitrary), and each audio contents block unit (ACBU) is composed of a plurality of packs corresponding to a time period ranging from 0.5 to 1.0 second (the number of packs is arbitrary). Also, the A-CONT pack in the ACB unit of the DVD-Audio format is arranged as the third pack in the VCB unit of the DVD-video format.

The A-CONT pack is basically arranged for each audio time of 0.5 second, and a final A-CONT pack placed in the end portion of each index is spaced apart from an A-CONT pack adjacent to the final A-CONT pack at a time period ranging from 0.5 to 1.0 second. Also, a group of audio frame units (GOF) corresponding to one audio time is indicated by the A-CONT pack, and a data position of the A-CONT pack is determined by the number of audio frames, the number of first access unit pointers and the number of frame headers. Also, it is not required that the A pack just before the A-CONT pack is packed at an interval of 0.5 second in the audio time.

The ACBU and the VCBU are shown in FIG. 2 to indicate the compatibility between the DVD-Audio disc and the DVD-video disc. That is, in cases where a DVD-Audio disc player is used to play back packs shown in FIG. 2, each VCBU shown in FIG. 2 is disregarded because the DVD-Audio disc player cannot detect the VCBU, and each ACBU is played back by the DVD-Audio disc player. In contrast, in cases where a DVD-video disc player is used to play back packs shown in FIG. 2, each ACBU shown in FIG. 2 is disregarded because the DVD-video disc player cannot detect the ACBU, and each VCBU is played back by the DVD-video disc player.

A pair of audio packs adjacent to each other are arranged to correlate audio signals of the audio packs with each other. For example, an audio pack of an L-channel audio signal is adjacent to an audio pack of a R-channel audio signal in case of a stereo. Also, a plurality of adjacent audio packs of audio signals in a multi-channel such gas 5 channels are arranged to correlate a plurality of audio signals of the adjacent audio packs with each other. In cases where a video is displayed when an audio signal is played back, a video pack of the video is arranged in adjacent to an audio pack of the audio signal.

Figure 3:
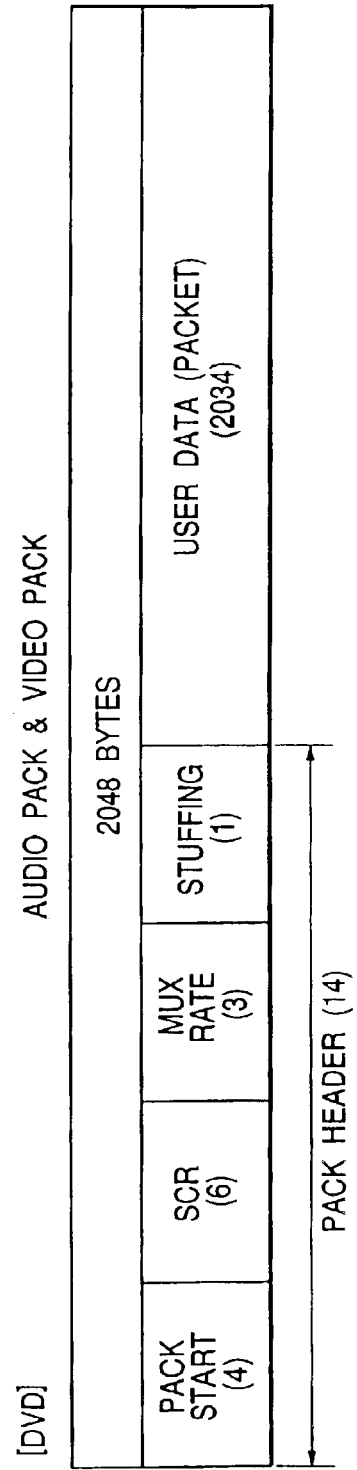
FIG. 3 is an explanatory view showing in detail a format of the audio pack (and the video pack) shown in FIG. 1A and FIG. 1B.

FIG. 3 shows in detail a format of the audio pack (and the video pack) according to the first embodiment of the present invention.

As shown in FIG. 3, in each pack (A pack and V pack), a pack header (14 bytes) composed of pack start information of 4 bytes, system clock reference (SCR) information of 6 bytes, multiplex (MUX) rate information of 3 bytes and a stuffing of 1 byte is added to user data (audio data of the pack or video data of the pack) of 2034 bytes. Therefore, each pack (A pack and V pack) has 2048 bytes. In this case, the SCR information denoting a time stamp is set to "1" in the top pack of each ACB unit corresponding to one title, and the values of the SCR information in the packs of the same title are consecutively changed. Therefore, the playback time for the A packs in the same title can be managed.

Figures 4, 5:
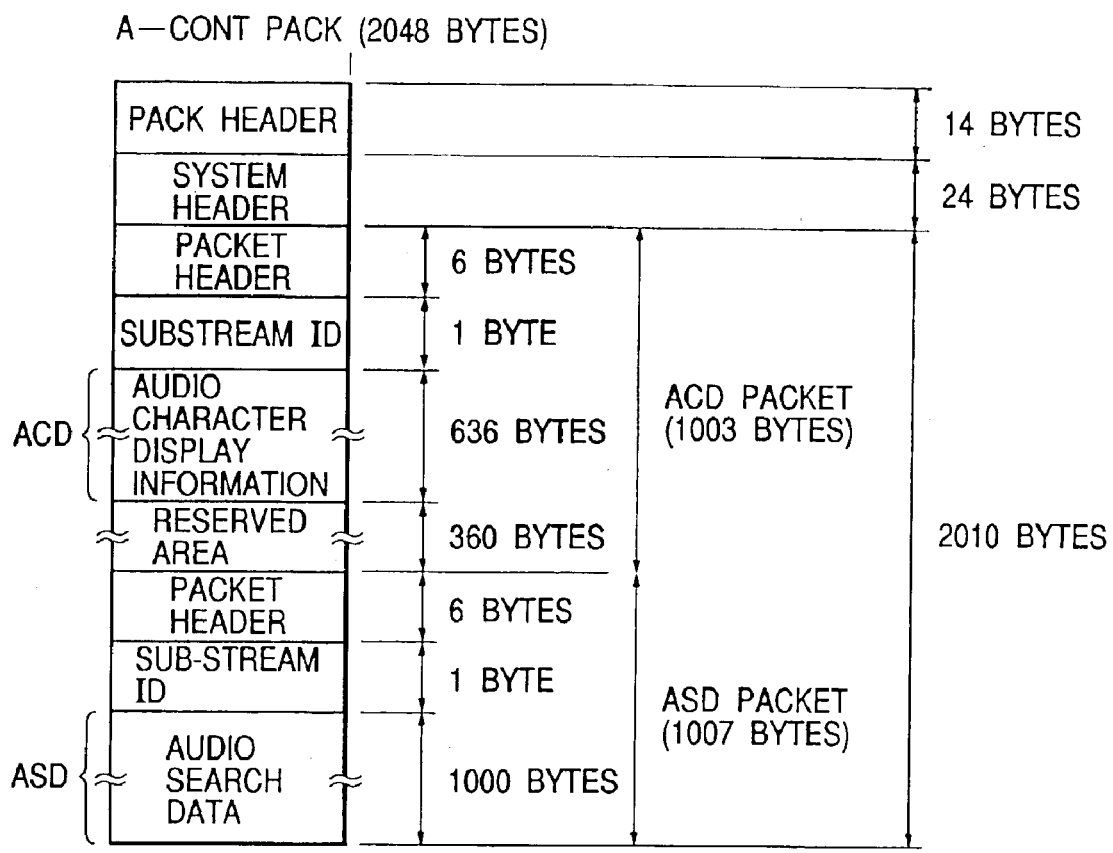
FIG. 4 is an explanatory view showing in detail a format of an audio control (A-CONT) pack shown in FIG. 1B.
FIG. 5 is an explanatory view showing in detail an area of audio character display (ACD) information shown in FIG. 4 according to the first embodiment of the present invention.

FIG. 4 shows in detail a format of an audio control (A-CONT) pack shown in FIG. 1B.

In contrast, as shown in FIG. 4, each A-CONT pack is composed of a back header of 14 bytes, a system header of 24 bytes, an audio character display (ACD) packet of 1003 bytes and an audio search data (ASD) packet of 1007 bytes arranged in that order. Also, the ACD packet is composed of a packet header of 6 bytes, sub-stream identification data of 1 byte, audio character display (ACD) information of 636 bytes (shown in FIG. 5 in detail) and a reserved area of 360 bytes arranged in that order. The audio character display (ACD) information indicates display characters (or a display text) relating to audio data of the audio (A) packs following the A-CONT pack, and the display characters indicated by the audio character display (ACD) information are displayed while playing back the audio data of the A packs. Also, the ASD packet is composed of a packet header of 6 bytes, sub-stream identification data of 1 byte and audio search data (ASD) of 1000 bytes (shown in FIG. 7 in detail) arranged in that order. The audio search data (ASD) denotes display time control data for controlling a display time of the display characters indicated by the audio character display (ACD) information.

FIG. 5 shows in detail an area of the audio character display (ACD) information according to the first embodiment of the present invention.

As shown in FIG. 5, an area of the ACD information is composed of an area (48 bytes) for general information, an area (294 bytes) for characters C1 (or a text) of a first language and an area (294 bytes) for characters C2 (or a text) of a second language. Each character area is composed of an area (93 bytes) of a name space, two areas of two free spaces respectively having 93 bytes and an area (15 bytes) of a data pointer.

FIG. 6 shows an example of a music name displayed according to information arranged in the name space area.

Title information indicating a music name expressed in Japanese is arranged in one of the name space areas of the characters C1 and C2, so that the music name is, for example, displayed in Japanese as shown in FIG. 6. Also, title information indicating the music name expressed in English is arranged in the other name space area, so that the music name is displayed in English as shown in FIG. 6. It is applicable that the information be set by a disc selling agency.

The general information of 48 bytes is, for example, composed of service level information of 16 bytes, language code information of 12 bytes, character set code information of 6 bytes, display item information of 6 bytes, "difference of ACD information from previous ACD information" information of 2 bytes and reserve information of 6 bytes. The service level information of 16 bytes indicates a display size of the title information, a display type of the title information, a distinction between audio information, video information and sub-picture (SP) information, and an audio stream. Also, the characters of the title information is mandatory, and a bit map of the title information is optional. In the language code information of 12 bytes, the first language and the second language are respectively indicated by a language code of 2 bytes in the same manner as in a video file, and the language code information can indicate a maximum of 8 languages. English is mandatory.

As the character set code information of 6 bytes, a maximum of 15 character codes corresponding to the language codes can be arranged. The existence of the characters C1 or C2 in one language and a type of the language are indicated by a character code of 1 byte. For example, character codes ISO646, ISO8859-1 and MS-JIS are used.

The display item information of 6 bytes indicates the existence of data arranged in each free space, the existence of data arranged in the data pointer and an identifier. Data arranged in the name space is mandatory, and a title name, a music name and an artist name are necessarily written.

FIG. 7 shows in detail a format of the audio search data (ASD) area according to the first embodiment of the present invention.

As shown in FIG. 7, the audio search data (ASD) of 1000 bytes is composed of general information of 16 bytes, current number information of 8 bytes, current date and time information of 16 bytes, title set search information of 8 bytes, title search information of 8 bytes, track search information of 404 bytes, index search information of 408 bytes, highlight search information of 80 bytes and a reserved area of 52 bytes.

The current number information of 8 bytes is composed of a current title number (2 bytes: BCD) in a title set, a current track number (2 bytes: BCD) in the title set, a current index number (2 bytes: BCD) in a track and a reserved area (2 bytes). The current date and time information of 16 bytes is composed of a playback time (4 bytes: BCD) in the track, a playback time (4 bytes: BCD) in the remaining portion of the track, an absolute time (4 bytes: BCD) in a title and an absolute time (4 bytes: BCD) in the remaining portion of the title.

The title set search information of 8 bytes is composed of a top sector number (4 bytes) of the title set and a final sector number (4 bytes) of the title set. The title set search information of 8 bytes is composed of a top sector number (4 bytes) of one title and a final sector number (4 bytes) of the title. The track search information of 404 bytes is composed of track and sector numbers (4 bytes*99) of one title, a top track number (4 bytes) of the title and a final track number (4 bytes) of the title.

The index search information of 408 bytes is composed of index and sector numbers (4 bytes*100) of one track, a top index number (4 bytes) of the track and a final index number (4 bytes) of the track. The highlight search information of 80 bytes is composed of a plurality of in-sector numbers (4 bytes*100) of one track and a plurality of out-sector numbers (4 bytes*100) of the track.

In the above DVD-Audio format of the DVD-Audio disc, because the A-CONT pack of the DVD-Audio format is arranged at the top portion of each ACBU in the same manner as the TOC information of the CD to manage an audio signal of a group of A packs following the A-CONT pack, audio data packed in the A packs is not integrated with video data of V packs. Therefore, the audio data is arranged independent of the video data, so that a memory capacity for the audio data can be sufficiently obtained.

Also, an audio playback time of the audio data can be managed according to audio control data of the A-CONT pack, and information of simple characters such as a music name relating to the audio data can be easily extracted from the ACD area of the A-CONT pack and can be displayed.

Also, TOC information such as information of a title, information of a start address, information of a music play time and the like is arranged in the A-CONT pack, even though the playback of the audio data is continued, the information corresponding to a user's operation can be extracted from the TOC information of the A-CONT pack, and the reproduction of the extracted information can be started. Therefore, the extracted information can be displayed while the user entertains a musical composition.

Also, in cases where the TOC information is arranged in audio manager information (AMGI) of the audio manager (AMG) or in the audio title set information (ATSI), the TOC information is stored in a memory of a disc playback apparatus, the information corresponding to a user's operation can be immediately extracted from the memory according to the TOC information, and the reproduction of the extracted information can be started.

Also, though a large capacity of information like program chain information (PGCI) is usually recorded in the DVD-video disc, because it is not required to record a large capacity of information like program chain information (PGCI) in the DVD-Audio disc, the DVD-Audio disc can be efficiently managed.

Also, in cases where any video (V) data is not arranged in ACBS, three effects can be obtained. That is, a search operation and a random access operation for three hierarchies composed of the title, the musical composition and the index can be performed (first effect). The detection of a top portion of each audio frame unit of the GOF, a time search and a random access can be performed (second effect). A time for playing back each title, a time for playing back each musical composition and a time for playing back each index can be managed in real time (third effect).

Also, in cases where video (V) data is arranged in the ACBS, the above first to third effects can be obtained for the audio data, and a current time and a remaining time can be displayed and managed in real time for the audio data during the reproduction of each title or musical composition (fourth effect).

Also, in cases where video (V) data is arranged in the ACBS, following effects can be obtained for the video data. A search operation and a random access operation for three hierarchies composed of the title, the PTT and the cell can be performed (first effect for the video data). The detection of a top portion of each video frame unit, a time search and a random access can be performed (second effect for the video data). A time for displaying each title, a time for displaying each PTT and a time for displaying each cell can be managed in real time (third effect for the video data). A current time and a remaining time can be displayed and managed in video frame unit time during the reproduction of each title or PTT (fourth effect for the video data).

In this embodiment, each ACBU shown in FIG. 2 includes one V pack and one CONT pack. However, as shown in FIG. 8, it is applicable that each ACBU does not include any CONT pack or V pack. In this case, though any video signal is not recorded in the DVD-Audio disc, a recording capacity for the audio signal in the DVD-Audio disc can be increased, so that a size of the DVD-Audio disc can be made small. Also, because a playback mechanism in a disc playback apparatus can be simplified, a DVD-Audio disc suitable for a portable type disc playback apparatus can be obtained.

Next, a second embodiment is described.

Figure 9A:
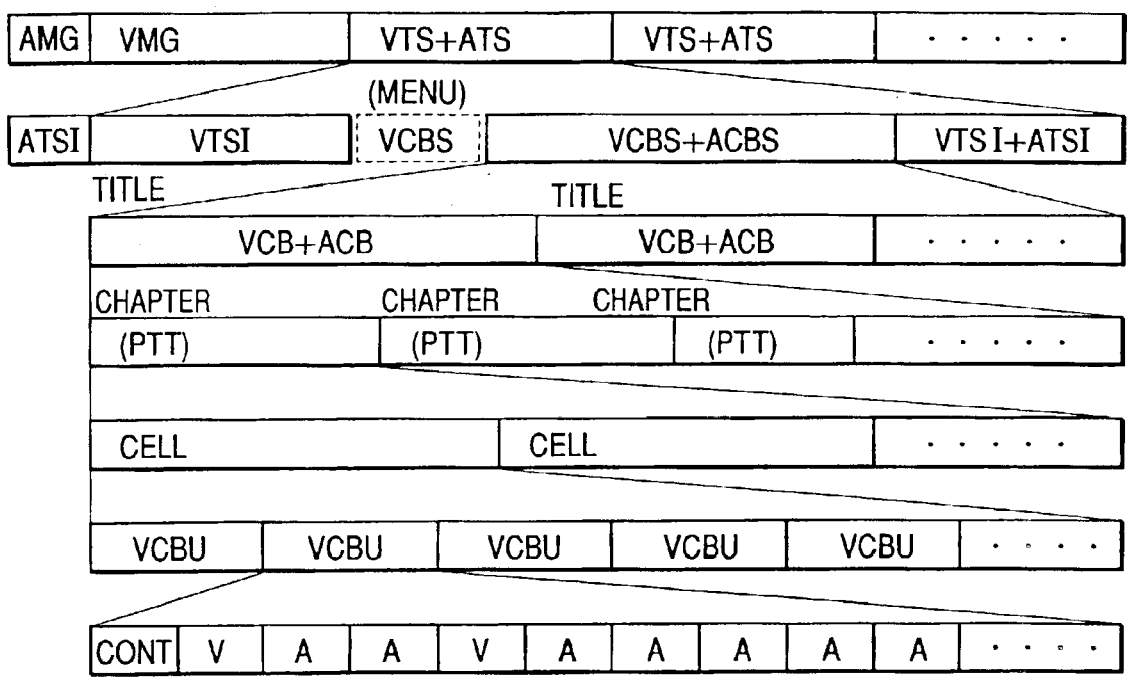
FIG. 9A shows a format of data recorded in a DVD-Van (video-audio navigation) disc on the basis of the DVD video standards according to a second embodiment of the present invention.

FIG. 9A shows a format of data recorded in a DVD-Van (video-audio navigation) disc on the basis of the DVD video standards according to a second embodiment of the present invention, FIG. 9B shows a video contents block unit (VCBU) shown in FIG. 9A according to the second embodiment of the present invention, FIG. 10 is an explanatory view showing in detail an area of audio character display (ACD) information according to the second embodiment of the present invention, and FIG. 11 is an explanatory view showing in detail a format of an audio search data (ASD) area according to the second embodiment of the present invention.

In the first embodiment, when pieces of audio data of the A packs recorded in the DVD-Audio disc are played back in a DVD-Audio disc player (or an audio data playback apparatus), the playback of the audio data is controlled according to the audio search data (ASD) of the A-CONT pack shown in detail in FIG. 7. That is, when pieces of audio data of the A packs are successively played back in a seamless playback, the playback of the audio data is controlled according to the current number and the current time of the audio search data (ASD). In contrast, when pieces of audio data of the A packs are intermittently played back in a jump playback, the playback of the audio data is controlled according to search information such as title set search information, title search information, track search information, index search information and highlight search information in the audio search data (ASD).

In contrast, in the second embodiment, to play back pieces of audio data and video data recorded in a DVD-Van (video-audio navigation) disc by using a DVD-video disc player, a format (shown in FIG. 9A) of data recorded in a DVD-Van disc is based on the DVD video standards shown in FIG. 1A. That is, as shown in FIG. 9B, each video contents block unit (VCBU) does not include any A-CONT pack, and each video contents block unit (VCBU) is composed of one CONT pack placed in the top area of the VCBU, a comparatively large number of A packs and a comparatively small number of V packs and corresponds to a time period ranging from 0.4 to 1.0 second (the number of packs is arbitrary). Also, each audio contents block unit (ACBU) is composed of one A pack, which is placed in the top area of the ACBU and succeeds one V pack of the VCBU, a comparatively large number of A packs and a comparatively small number of V packs and corresponds to a time period ranging from 0.4 to 1.0 second (the number of packs is arbitrary). In cases where a DVD-video disc player is used to play back packs shown in FIG. 9B, each ACBU shown in FIG. 9B is disregarded because the DVD-video disc player cannot detect the ACBU, and each VCBU is played back by the DVD-video disc player. Here, VCBU is also called VOBU on the basis of the DVD video standards.

Because each ACBU does not include any A-CONT pack, a packet of the audio character display (ACD) information and a packet of the audio search data (ASD) arranged in each A-CONT pack in the first embodiment are arranged in each video manager (VMG) and/or each video title set (VTS) shown in FIG. 9A. Or, as shown in FIG. 9A, an audio manager AMG is additionally arranged with each VMG, an audio title set (ATSI) is additionally arranged with each VTS, and a packet of the audio character display (ACD) information and a packet of the audio search data (ASD) arranged in each A-CONT pack in the first embodiment are arranged in each AMG and each ATS. The AMG and ATS additionally arranged have the same function as those shown in FIG. 1B.

Also, because a packet of the audio character display (ACD) information is arranged in the A-CONT pack, which is arranged for each ACBU (a time period ranging from 0.4 to 1.0 second), in the first embodiment, audio character display information for many display images can be recorded. However, in the second embodiment, because a packet of the audio character display (ACD) information is arranged in each video manager (VMG) and/or each video title set (VTS), a volume of the ACD information recorded in the audio disc is limited. Accordingly, a title name of each musical composition or the like is recorded as audio character display (ACD) information because a data volume of the title name is low. Also, only one piece of audio playback control information described later is arranged in a packet of the audio character display (ACD) information.

Also, the audio character display (ACD) information has data of the characters C1 of the first language and data of the characters C2 of the second language in the first embodiment. However, as shown in FIG. 10, it is applicable that audio playback control information of 294 bytes be arranged in place of the data of the characters C2 of the second language. Therefore, an area of the audio character display (ACD) information is composed of an area of the general information (48 bytes), an area of the data of the characters C1 of the first language, for example, indicating "audio navigation" such as a name of a musical composition (294 bytes) and an area of the audio playback control information (294 bytes).

Contents of the audio playback control information are arbitrary. For example, the area of the audio playback control information (294 bytes) is composed of areas of 10 types of audio playback control information respectively having 25 bytes and a reserved area (44 bytes). These types of audio playback control information are selected by a user to control a sound quality of the played-back audio signal. These types of audio playback control information are recommended by professional human mixers and are determined to set a sound quality of an audio signal in a playback operation to a best condition according to a music category (for example, classic, jazz, rock or background music) of the audio signal, a playing condition of the music, a recording condition of the audio signal or circumstances of a playback condition in cases where the user plays back the music of the audio signal arranged in the A packs. In the reserved area, a plurality of mixing coefficients are arranged. In cases where the number of channels for the audio signal is 6, the number of channels is mix-downed to 2 by using the mixing coefficients, so that the audio signal can be played back in stereo.

When pieces of audio data of a series of A packs are played back in a seamless playback, the seamless playback is performed according to information of a CONT pack. Therefore, a group of the current number information (8 bytes) and the current time information (16 bytes) arranged in the audio search data (ASD) according to the first embodiment is not required. Therefore, as shown in FIG. 11, the area of the current number information, the area of the current time information and the reserved area (52 bytes) arranged in the audio search data (ASD) shown in FIG. 7 are replaced with a reserved area (76 bytes) in the second embodiment. In this case, because any current number information or any current time information is not arranged in the audio search data (ASD), a display operation or a playback control cannot be minutely performed. However, data recorded in the DVD-Van disc can be played back by using a DVD-video disc player. Therefore, in a transition period before a steady period in which data recorded in the audio disc cannot be played back by using a DVD-video disc player but can be played back by using a DVD-Audio disc player, the DVD-van disc, in which data reproducible by using a DVD-video disc player is recorded, is useful.

Next, the configuration of information packed in the CONT pack is described in detail with reference to FIG. 12.

FIG. 12 shows in detail a configuration of a navigation control pack (CONT pack).

As shown in FIG. 12, the CONT pack, called a navigation control pack in the DVD video standards, is composed of a pack header of 14 bytes, a system header of 24 bytes, a presentation control information (PCI) packet of 986 bytes and a data search information (DSI) packet of 1024 bytes. The PCI is called playback control information, and the PCI packet is composed of a packet header of 6 bytes, a sub-stream identification (ID) of 1 byte and PCI data of 979 bytes. The DSI packet is composed of a packet header of 6 bytes, a sub-stream identification (ID) of 1 byte and DSI data of 1017 bytes.

FIG. 13 shows in detail a configuration of the PCI data.

As shown in FIG. 13, the PCI data, which denotes navigation data for controlling the reproduction of the corresponding VOBU, is composed of PCI general information (PCI-GI) of 60 bytes, a non-seamless angle information (NSML-AGLI) of 36 bytes, highlight information (HLI) of 694 bytes and record information (RECI) of 189 bytes.

FIG. 14 shows in detail a configuration of the PCI general information (PCI GI).

As shown in FIG. 14, the PCI general information (PCI GI) of the PCI data is composed of "LBN of the navigation control pack (CONT pack)" (NV PCK LBN) of 4 bytes, "category of the VOBU" (VOBU CAT) of 2 bytes, a reserved area of 2 bytes, "user operation control information of the VOBU" (VOBU UOP CTL) of 4 bytes, "start PTM of the VOBU" (VOBU S PTM) of 4 bytes, "end PTM of the VOBU" (VOBU E PTM) of 4 bytes, "end PTM of the sequence end in the VOBU" (VOBU SES PTM) of 4 bytes, "elapsed time in a cell" (C ELTM) of 4 bytes, and a reserved area of 32 bytes.

In the "LBN of the navigation control pack" (NV PCK LBN), an address of the navigation control pack, in which the PCI is included, is described from the top LB of the VOBS, in which the PCI is included, in RLBN. Also, in the "category of the VOBU" (VOBU CAT), conditions of analog protection system (APS) of the VOBU are described.

The non-seamless angle information (NSML AGLI) shown in FIG. 13 denotes information relating to a changed address in an angle change and is effective in cases where an angle cell change is changed to a non-seamless, that is, a seamless angle change flag is set in a non-seamless. The highlight information (HLI) shown in FIG. 13 denotes information for highlighting a rectangular area of a sub-picture display area, and a mixing ratio (or a contrast) of a video color and a sub-picture color in a special rectangular area can be changed according to the highlight information. Also, a play time period of a sub-picture unit (SPU) of each sub-picture stream is the same as an effective time period of the highlight information (HLI).

FIG. 15 shows in detail a configuration of the record information (RECI).

As shown in FIG. 15, the record information (RECI) shown in FIG. 13 is composed of "ISRC of video data in a video stream" (ISRC V) of 10 bytes, "ISRC of audio data in a decoding audio stream #0" (ISRC A0) of 10 bytes, "ISRC of audio data in a decoding audio stream #1" (ISRC A1) of 10 bytes, "ISRC of audio data in a decoding audio stream #2", (ISRC A2) of 10 bytes, "ISRC of audio data in a decoding audio stream #3" (ISRC A3) of 10 bytes, "ISRC of audio data in a decoding audio stream #4" (ISRC A4) of 10 bytes, "ISRC of audio data in a decoding audio stream #5" (ISRC A5) of 10 bytes, "ISRC of audio data in a decoding audio stream #6" (ISRC A6) of 10 bytes, "ISRC of audio data in a decoding audio stream #7" (ISRC A7) of 10 bytes, "ISRC of sub-picture (SP) data in a decoding SP stream #0, #8, #16 or #24" (ISRC SP0) of 10 bytes, "ISRC of SP data in a decoding SP stream #1, #9, #17 or #25" (ISRC SP1) of 10 bytes, "ISRC of SP data in a decoding SP stream #2, #10, #18 or #226" (ISRC SP2) of 10 bytes, "ISRC of SP data in a decoding SP stream #3, #11, #19 or #27" (ISRC SP3) of 10 bytes, "ISRC of SP data in a decoding SP stream #4, #12, #20 or #28" (ISRC SP4) of 10 bytes, "ISRC of SP data in a decoding SP stream #5, #13, #21 or #29" (ISRC SP5) of 10 bytes, "ISRC of SP data in a decoding SP stream #6, #14, #22 or #30" (ISRC SP6) of 10 bytes, "ISRC of SP data in a decoding SP stream #7, #15, #23 or #31" (ISRC SP7) of 10 bytes, "a group of SP streams selected for the ISRC" (ISRC SP SEL) of 1 byte, and a reserved area of 18 bytes.

FIG. 16 shows in detail a configuration of the data search information (DSI) shown in FIG. 12.

As shown in FIG. 16, the data search information (DSI), which denotes navigation data used to search data and to perform the seamless playback of the VCBU, is composed of DSI general information (DSI GI) of 32 bytes, seamless playback information (SML PBI) of 148 bytes, seamless angle information (SML AGLI) of 54 bytes, VOBU search information (VOBU SRI) of 168 bytes, synchronization information (SYNCI) of 144 bytes and a reserved area of 471 bytes.

FIG. 17 shows in detail a configuration of the DSI general information (DSI GI).

As shown in FIG. 17, the DSI general information (DSI GI) is composed of "system clock reference (SCR) base of the navigation control pack" (NV PCK SCR) of 4 bytes, "LBN of the navigation control pack" (NV PCK LBN) of 4 bytes, "end address of VOBU" (VOBU EA) of 4 bytes, "end address of a first reference picture of VOBU" (VOBU 1STREF EA) of 4 bytes, "end address of a second reference picture of VOBU" (VOBU 2NDREF EA) of 4 bytes, "end address of a third reference picture of VOBU" (VOBU 3RDREF EA) of 4 bytes, "VOB ID number of VOBU" (VOBU VOB IDN) of 2 bytes, a reserved area of 1 byte, "cell ID number of VOBU" (VOBU C IDN) of 1 byte, and "cell elapsed time" (C ELTM) of 4 bytes.

FIG. 18 shows in detail a configuration of the seamless playback information (SML PBI) shown in FIG. 16.

As shown in FIG. 18, the seamless playback information (SML PBI) is composed of "category of seamless VOBU" (VOBU SML CAT) of 2 bytes, "end address of an inter-leaved unit" (ILVU EA) of 4 bytes, "start address of a next inter-leaved unit" (NXT ILVU SA) of 4 bytes, "size of the next inter-leaved unit" (NXT ILVU SZ) of 4 bytes, "start PTM of video in VOB" (VOB V S PTM) of 4 bytes, "end PTM of video in VOB" (VOB V E PTM) of 4 bytes, and "end PTM of audio in VOB" (VOB A STP PTM) of 8 bytes*8, "gap length of audio in VOB" (VOB A GAP LEN) of 8 bytes*8.

FIG. 19 shows in detail a configuration of the seamless angle information (SML AGLI) shown in FIG. 16.

As shown in FIG. 19, the seamless angle information (SML AGLI) denotes information relating to a changed address in an angle change and is effective in cases where an angle change is performed in seamless, that is, in cases where a seamless angle change flag is set in a "seamless".

Figure 20:
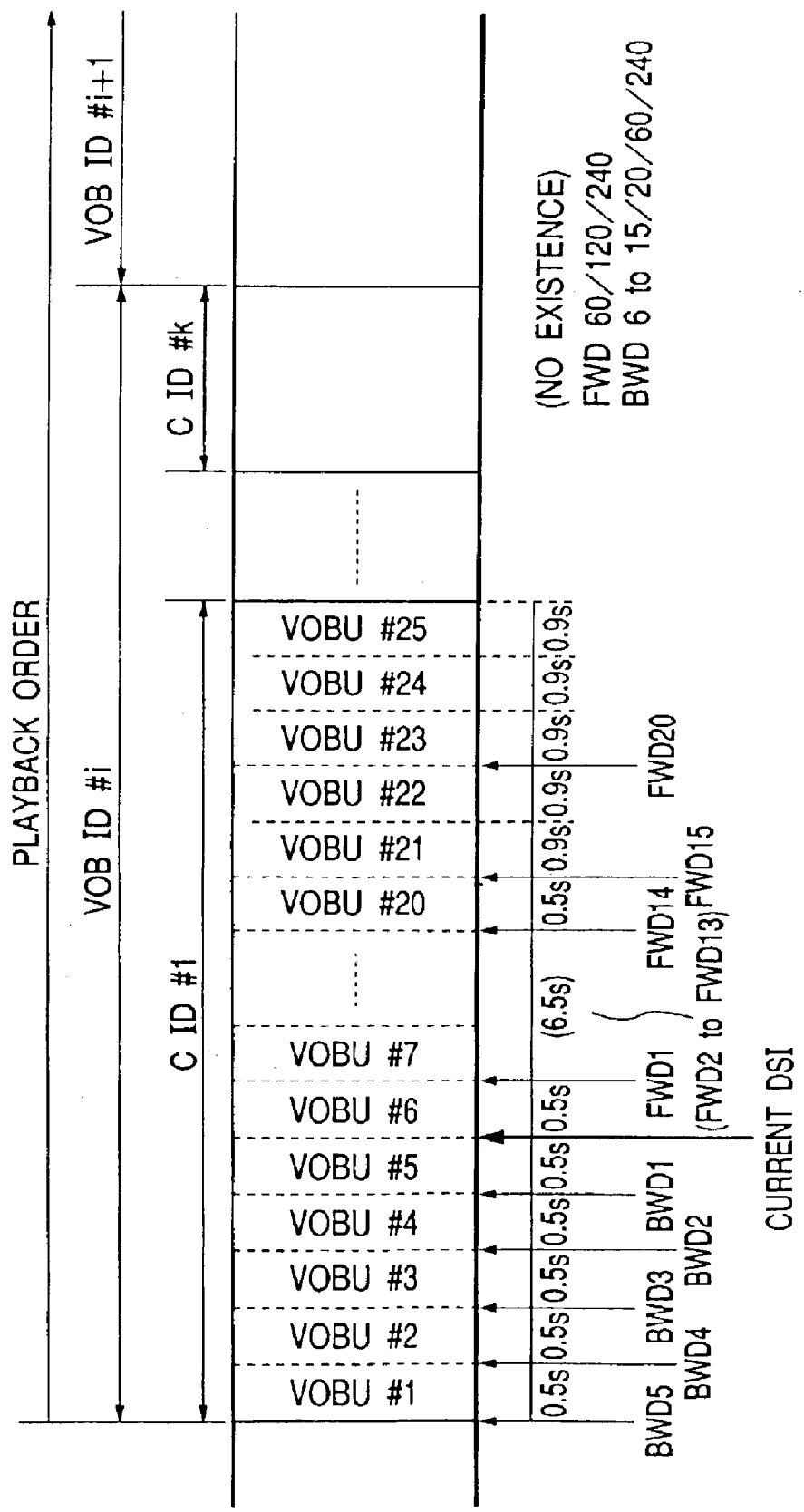
FIG. 20 is an explanatory view showing an example of a series of VOBUs, of which head addresses are described in an area of VOBU search information (VOBU SRI) shown in FIG. 16.

FIG. 20 shows an example of a series of VOBUs, of which head addresses are described in an area of the VOBU search information (VOBU SRI) shown in FIG. 16.

As shown in FIG. 20, a head address of a VOBU to be played back at 0.5*N seconds after a playback start time of a VOBU including the DSI in a cell is described in the VOBU search information (VOBU SRI). Also, a head address of a VOBU to be played back at 0.5*N seconds before a playback start time of the VOBU including the DSI in the cell is described in the VOBU search information (VOBU SRI). The VOBU search information (VOBU SRI) is effective only in the corresponding cell.

FIG. 21 shows in detail a configuration of the VOBU search information (VOBU SRI) shown in FIG. 16.

As shown in FIG. 21, the VOBU search information (VOBU SRI) is composed of "head address of a next VOBU having video data" (FWDI VIDEO) of 4 bytes, "+240 VOBU head address and video existence flag" (FWDI 240) of 4 bytes, "+120 VOBU head address and video existence flag" (FWDI 120) of 4 bytes, "+60 VOBU head address and video existence flag" (FWDI 60) of 4 bytes, "+20 VOBU head address and video existence flag" (FWDI 20) of 4 bytes, "+15 VOBU head address and video existence flag" (FWDI 15) of 4 bytes, "+14 VOBU head address and video existence flag" (FWDI 14) of 4 bytes, "+13 VOBU head address and video existence flag" (FWDI 13) of 4 bytes, "+12 VOBU head address and video existence flag" (FWDI 12) of 4 bytes, "+11 VOBU head address and video existence flag" (FWDI 11) of 4 bytes, "+10 VOBU head address and video existence flag" (FWDI 10) of 4 bytes, "+9 VOBU head address and video existence flag" (FWDI 9) of 4 bytes, "+8 VOBU head address and video existence flag" (FWDI 8) of 4 bytes, "+7 VOBU head address and video existence flag" (FWDI 7) of 4 bytes, "+6 VOBU head address and video existence flag" (FWDI 6) of 4 bytes, "+5 VOBU head address and video existence flag" (FWDI 5) of 4 bytes, "+4 VOBU head address and video existence flag" (FWDI 4) of 4 bytes, "+3 VOBU head address and video existence flag" (FWDI 3) of 4 bytes, "+2 VOBU head address and video existence flag" (FWDI 2) of 4 bytes, "+1 VOBU head address and video existence flag" (FWDI 1) of 4 bytes, "next VOBU head address and video existence flag" (FWDI Next) of 4 bytes, "previous VOBU head address and video existence flag" (BWDI Prev) of 4 bytes, "−1 VOBU head address and video existence flag" (BWDI 1) of 4 bytes, "−2 VOBU head address and video existence flag" (BWDI 2) of 4 bytes, "−3 VOBU head address and video existence flag" (BWDI 3) of 4 bytes, "−4 VOBU head address and video existence flag" (BWDI 4) of 4 bytes, "−5 VOBU head address and video existence flag" (BWDI 5) of 4 bytes, "−6 VOBU head address and video existence flag" (BWDI 6) of 4 bytes, "−7 VOBU head address and video existence flag" (BWDI 7) of 4 bytes, "−8 VOBU head address and video existence flag" (BWDI 8) of 4 bytes, "−9 VOBU head address and video existence flag" (BWDI 9) of 4 bytes, "−10 VOBU head address and video existence flag" (BWDI 10) of 4 bytes, "−11 VOBU head address and video existence flag" (BWDI 11) of 4 bytes, "−12 VOBU head address and video existence flag" (BWDI 12) of 4 bytes, "−13 VOBU head address and video existence flag" (BWDI 13) of 4 bytes, "−14 VOBU head address and video existence flag" (BWDI 14) of 4 bytes, "−15 VOBU head address and video existence flag" (BWDI 15) of 4 bytes, "−20 VOBU head address and video existence flag" (BWDI 20) of 4 bytes, "−60 VOBU head address and video existence flag" (BWDI 60) of 4 bytes, "−120 VOBU head address and video existence flag" (BWDI 120) of 4 bytes, "−240 VOBU head address and video existence flag" (BWDI 240) of 4 bytes, and "head address of a previous VOBU having video data" (BWDI VIDEO) of 4 bytes.

FIG. 22 shows in detail a configuration of the synchronization information (SYNCI) shown in FIG. 16.

As shown in FIG. 22, the synchronization information (SYNCI), which denotes pieces of address information of audio data and sub-picture data played back in synchronization with the video data of the VOBU including the DSI, is composed of "addresses of audio packs (A PCK)" (A SYNCA 0 to 7) of 2 bytes*8, and "head addresses of VOBUs for sub-picture packs (SP PCK)" (SP SYNCA 0 to 31) of 4 bytes*32.

Next, a disc identification according to the first and second embodiments is described.

FIG. 23 shows a configuration of a recording area of a DVD.

As shown in FIG. 23, a recording area of a DVD comprises a read-in area and a data area. The read-in area of the DVD comprises all blocks of 00h from a read-in start block to a block just before a sector number "02F000h", a reference code block corresponding to 2 blocks from the sector number "02F000h" to a block just before a sector number "02F020h", all 30 blocks of 00h from the sector number "02F020h" to a block just before a sector number "02F200h", a control data block corresponding to 192 blocks from the sector number "02F200h" to a block just before a sector number "02FE00h", and all 32 blocks of 00h from the sector number "02FE00h" to a block just before a sector number "03000h". Also, the data area of the DVD comprises blocks starting from the sector number "03000h", character codes ISO 9660 and micro universal disc format (UDF) data are recorded in the data area, and an audio title set (TS), a video TS, a computer TS and the like are recorded in the data area.

FIG. 24 shows a configuration of the control data block of the read-in area of the DVD shown in FIG. 23.

As shown in FIG. 24, physical format information is recorded in a sector (a sector No. 0) of the control data block, disc production information is recorded in a sector (a sector No. 1) of the control data block, and copyright information is recorded in a plurality of sectors (from a sector No. 2 to a sector No. 15) of the control data block. An empty area, in which the copyright information is not recorded, exists in the sectors No. 2 to No. 15.

Figure 25:
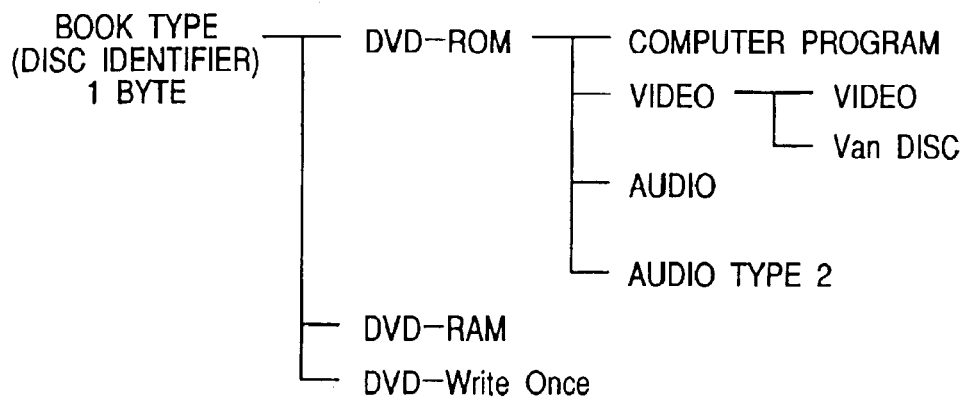
FIG. 25 is an explanatory view showing a configuration of a sector of physical format information shown in FIG. 24.

FIG. 25 shows a configuration of the sector of the physical format information.

As shown in FIG. 25, the sector of the physical format information comprises an area of a book type and a part version, an area of a disc size and a minimum read-out rate, an area of a disc structure, an area of a recording density and an area of a data area allocation. The area of a book type and a part version is allocated as a disc identification. That is, upper bits of the disc identification indicates a DVD-ROM disc, a DVD-RAM disc or a DVD-write once disc. In cases where the upper bits indicates the DVD-ROM disc, lower bits of the disc identification indicates a computer program disc, a pure video disc, a video-audio navigation disc: Van-disc, an audio disc or an audio disc type 2.

Therefore, a disc identification indicating the DVD-ROM-audio disc is described in the disc corresponding to the first embodiment according to the book type and the part version. Also, a disc identification indicating the DVD-ROM-Van-disc is described in the disc corresponding to the second embodiment according to the book type and the part version.

Also, though any TOC information, for example, indicating a top address of a musical composition (or a movement of a symphony) is not recorded in the read-in area of the DVD-ROM-pure video disc, the TOC information, for example, indicating a top address of a musical composition (or a movement of a symphony) is recorded in the read-in area of the DVD-ROM-audio disc corresponding to the first embodiment and in the read-in area of the DVD-ROM-Van-disc corresponding to the second embodiment.

Accordingly, because the number of A packs is larger than the number of V packs in each VOBU, in cases where video data of the V packs is reproduced on a display, static pictures or a moving picture moved slightly are displayed. However, because audio data of the A packs of each VOBU is played back according to information of the CONT pack based on the DVD video standards, the audio data of the A packs can be played back by using a DVD-video disc player.

In cases where audio data of A packs is recorded in a hierarchical structure composed of title, track and index to search the A packs for the audio data or in cases where audio data of A packs can be accessed at random, the audio data can be easily played back. However, there is a problem that the recording of the TOC information indicating a position of the audio data in the disc is complicated. Also, in cases where a simple playback of the audio data is performed by using the TOC information, unless a sampling frequency of the audio data is specified, the audio data cannot be played back. In cases where the TOC information is recorded in the read-in area, which is adopted in the DVD-video disc, of the DVD-Audio disc or the DVD-Van disc, unless the TOC information recorded in the DVD-Audio disc or the DVD-Van disc is compatible with the TOC information recorded in the DVD-video disc and is easily accessed, it is difficult to widely spread the DVD-Audio disc or the DVD-Van disc in which the audio data is recorded with the TOC information.

To avoid the above problems, a DVD-Audio disc having a hierarchical structure to present the contents in a DVD-Audio zone is described with reference to FIG. 26A.

Figure 26A:
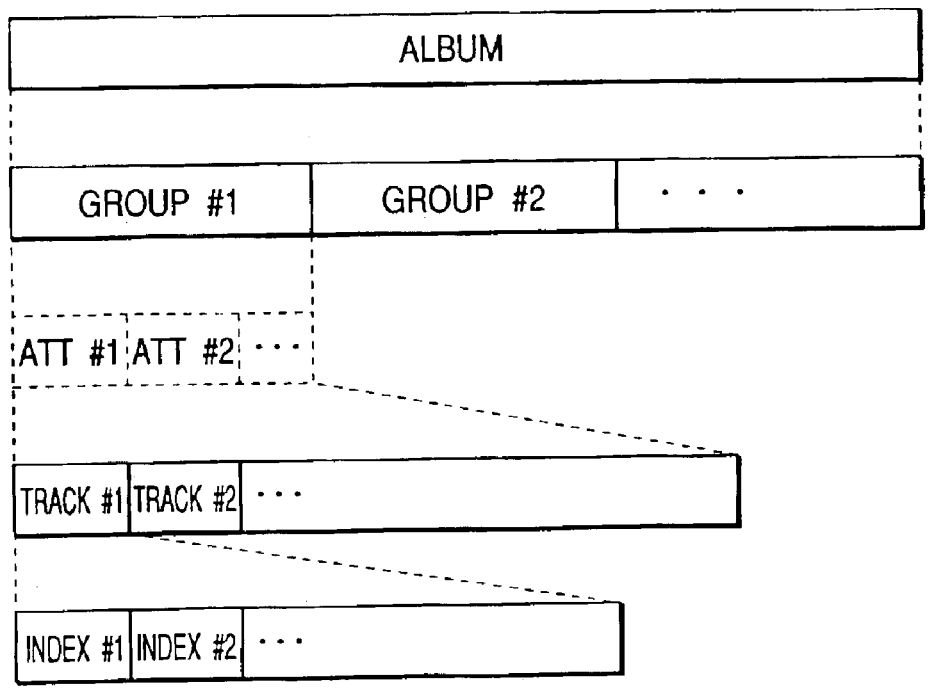
FIG. 26A shows a format of data recorded in a DVD-Audio disc.

FIG. 26A shows a format of data recorded in a DVD-Audio disc.

Figure 31A:
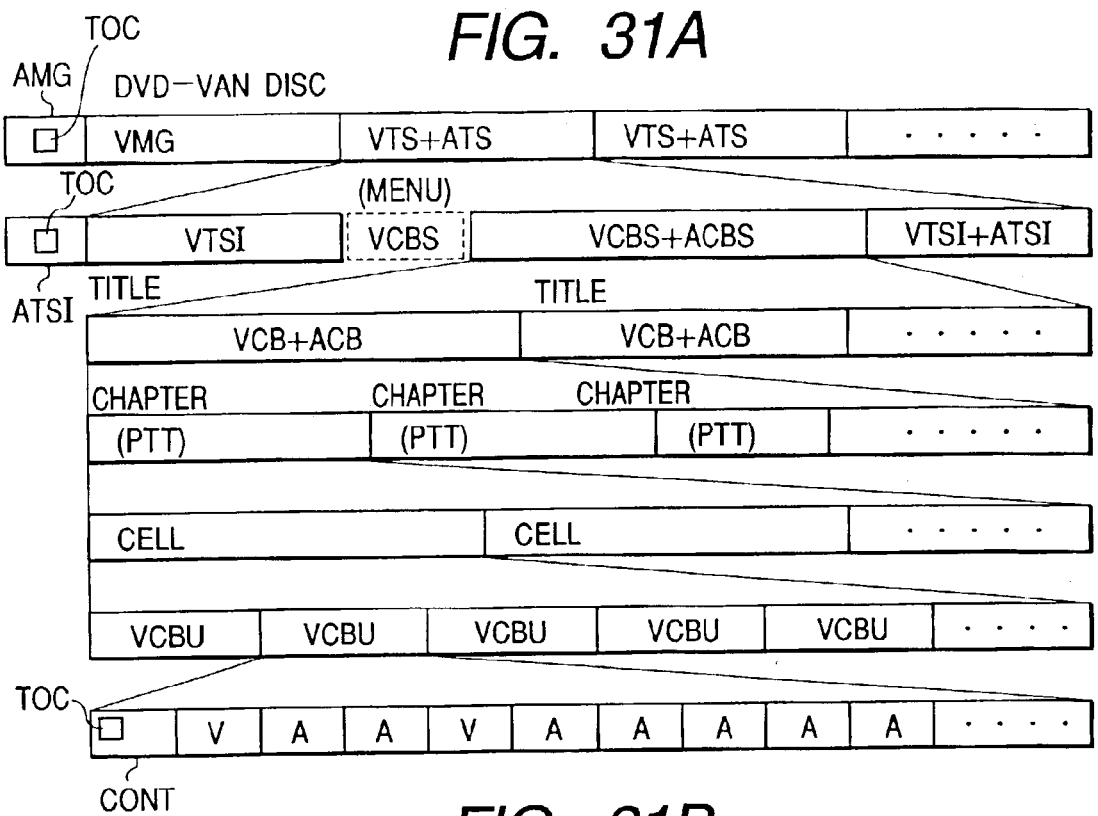
FIG. 31A is an explanatory view showing a format of data in which TOC information is recorded in a management area such as AMG or ATSI of ATS or in a pack such as a CONT pack in the DVD-Van disc or the DVD-ROM-audio disc type.
Figure 31B:
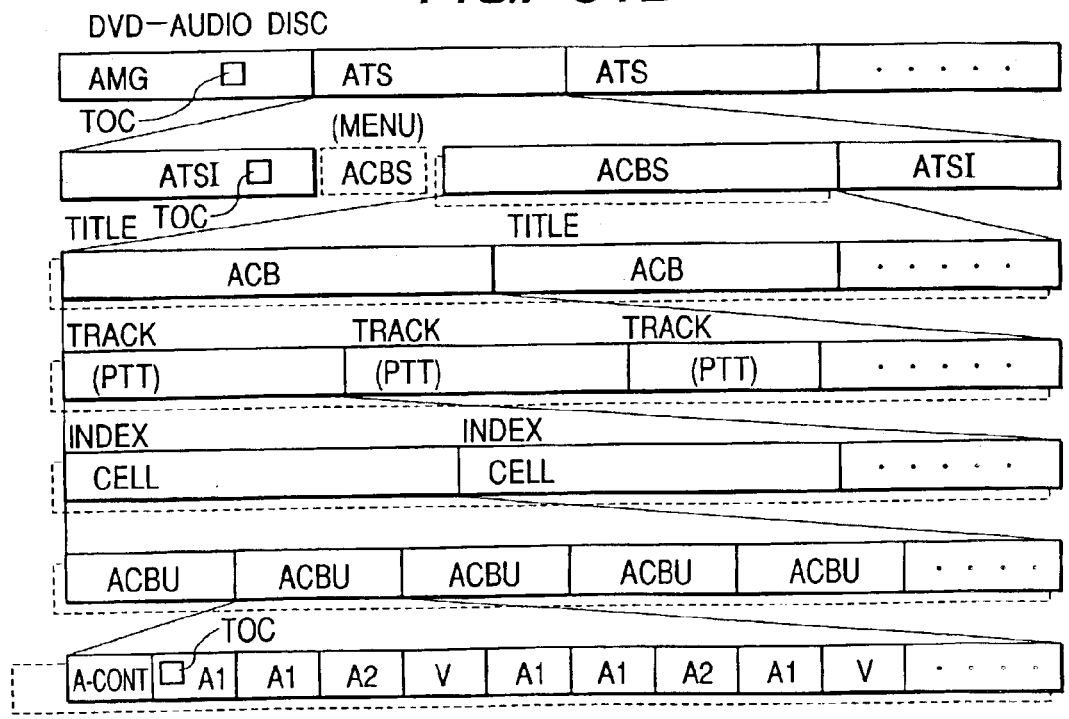
FIG. 31B is an explanatory view showing a format of data in which TOC information is recorded in a management area such as AMG or ATSI of ATS or in a pack such as an A pack in the DVD-Audio disc, the DVD-Van disc or the DVD-ROM-audio disc type.

As shown in FIG. 26A, a DVD-Audio disc has a navigation information of a hierarchical structure to present the contents in a DVD-Audio zone, which is composed of Album, Group, Audio Title (ATT), Track and Index. The navigation information is a kind of TOC information and is sometimes called TOC information. As shown in FIG. 31B by a symbol "TOC", the navigation information called TOC information may be placed in the AMG and the ATSI. In this presentation structure, Group and Track shall be accessible by User, and Album and Index may be accessed by User. The ATT is used only as the internal logical unit to present the contents. An Album is a Volume. The contents in the DVD-Audio disc are recorded in either one side or two sides, but each side shall have one Volume. A Group is a Title Group (TT GR) and contains one or more Audio Title(s). ATTs within the same Title Group shall guarantee the continuous presentation.

Audio data of a musical composition (or a movement of a symphony) is arranged for each Track, so that TOC information is prepared for each Track. Also, because a plurality of Tracks are arranged in the order of arranging the ATTs, pieces of TOC information are prepared in the order of arranging the Audio Titles (ATTs), so that the audio data recorded in the DVD-Audio disc can be efficiently managed. The pieces of TOC information are also called TOC information for convenience.

Also, a sampling frequency of the audio data or the number of quantization bits in the audio data is arranged in the TOC information for each track, a simple playback of the audio data can be easily performed by using the TOC information.

Also, the TOC information is additionally recorded in an empty area (or a reserved area) of the copyright information which is recorded in the control data block of the read-in area adopted in the DVD-video disc. For example, as shown in FIG. 24, because an area from the sector No. 2 to the sector No. 15 in the control data block of the read-in area of a DVD is reserved in advance for the copyright information, the TOC information is recorded in an empty area (or a reserved area) from the sector No. 8 to the sector No. 15. In this case, the copyright information is recorded in an area from the sector No. 2 to the sector No. 7.

FIG. 27A shows a configuration of TOC information recorded in the area (from the sector No. 8 to the sector No. 15) of the copyright information shown in FIG. 24.

As shown in FIG. 27A, TOC information, which is called a simple audio play pointer (SAPP), comprises simple audio play pointer table information (SAPPTI) of 16 bytes, and simple audio play pointers #1 to #n (SAPP #1 to #n) of 48*n bytes. The simple audio play pointer table information (SAPPTI) comprises an SAPPTI identifier of 12 bytes, the number of SAPPs of 2 bytes and an SAPPTI end address of 2 bytes. Each simple audio play pointer (SAPP) denotes TOC information for the track pointed by the SAPP.

FIG. 27B shows a configuration of each simple audio play pointer.

As shown in FIG. 27B, each simple audio play pointer (SAPP) comprises a group of the SAPP (1 byte), a track No. of the SAPP (1 byte), a start presentation time of the first cell in the track pointed by the SAPP (4 bytes), a playback time of the track pointed by the SAPP (4 bytes), a pause time of the track pointed by the SAPP (4 bytes), an attribute (SAPP-ATR) of the track pointed by the SAPP (4 bytes), a reserved area (18 bytes), a start address of the track pointed by the SAPP (4 bytes), a start address of the first cell of the track pointed by the SAPP (4 bytes), and an end address of the track pointed by the SAPP (4 bytes).

Figure 26B:
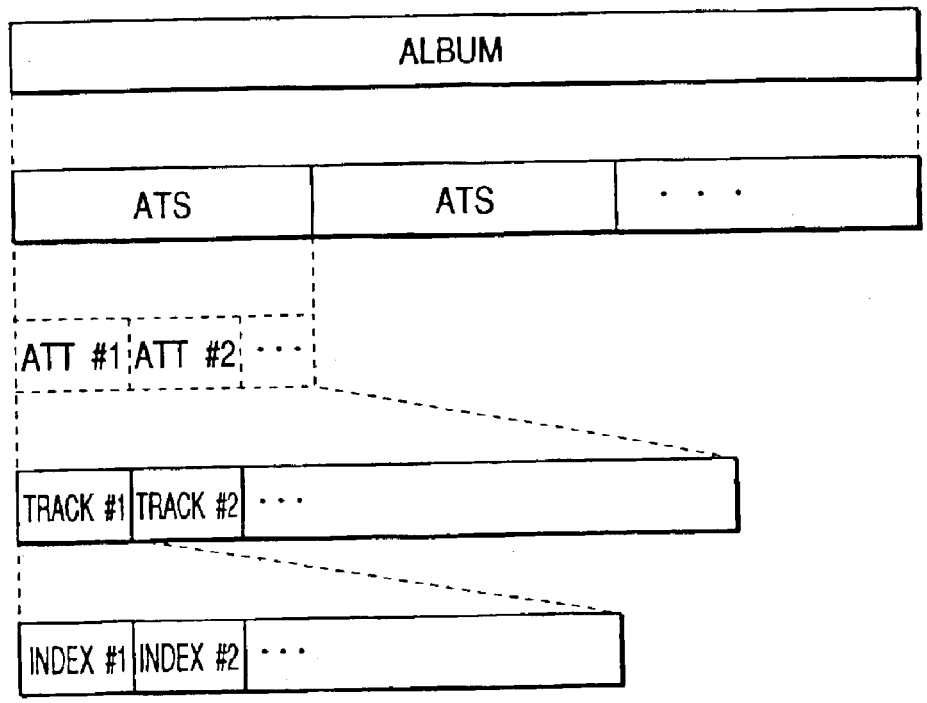
FIG. 26B shows another format of data recorded in a DVD-Audio disc.

In FIG. 26A, the hierarchical structure in the navigation information called TOC information is composed of Album, Group, Audio Title (ATT), Track and Index. However, as shown in FIG. 26B, it is applicable that the hierarchical structure in the navigation information called TOC information be composed of Album, Audio Title Set (ATS), Audio Title (ATT), Track and Index. In this case, a configuration of each simple audio play pointer is shown in FIG. 27C.

FIG. 28 shows a format of the track attribute (SAPP-ATR).

As shown in FIG. 28, the format of the track attribute (SAPP-ATR) is described in a direction from the most significant bit (MSB) to the least significant bit (LSB). The track attribute (SAPP-ATR) is composed of the number of quantization bits of 4 bits (b23 to b20), a sampling frequency Fs of 4 bits (b15 to b12) and a decoding audio stream number of 3 bits (b7 to b5). Pieces of information of the simple audio play pointers #1 to #n (SAPP #1 to #n) are recorded in track portions, which are obtained by dividing a track (or a movement) into n pieces, with an album number belonging to the track.

Next, a third embodiment is described with reference to FIG. 29 and FIG. 30.

Figure 29:
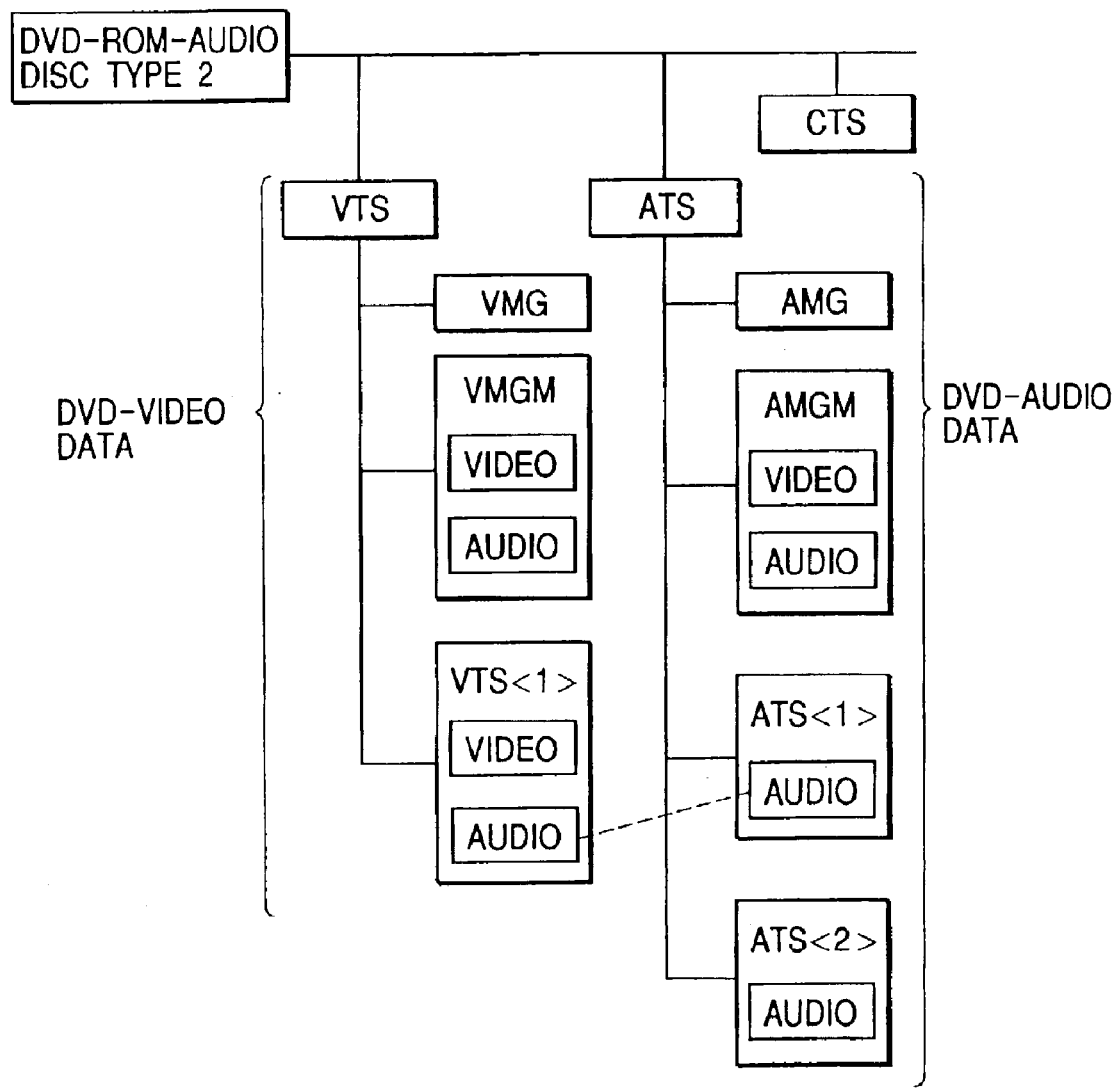
FIG. 29 shows a fundamental format of data recorded in a DVD-ROM-audio disc type according to a third embodiment of the present invention.
Figure 30:
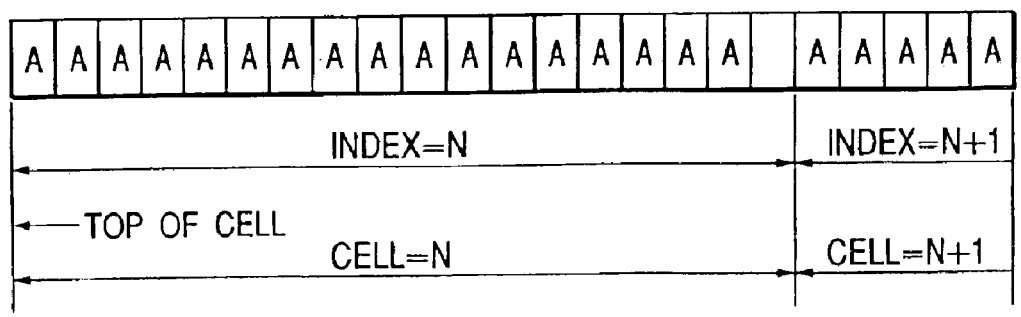
FIG. 30 shows a portion of an audio title set (ATS) according to the third embodiment.

FIG. 29 shows a fundamental format of data recorded in a DVD-ROM-audio disc type 2 according to a third embodiment of the present invention, and FIG. 30 shows a portion of an audio title set (ATS) according to the third embodiment.

As shown in FIG. 29, data to be reproduced by using a DVD-video disc player is recorded in a DVD-ROM-Audio disc type 2 as DVD-video data of a video title set (VTS) at a video format, and data to be played back by using a DVD-Audio disc player is recorded in the DVD-ROM-Audio disc type 2 as DVD-Audio data of an audio title set (ATS) at an audio format.

The DVD-video data recorded at the video format comprises a video manager (VMG) shown in FIG. 1A, a video manager menu (VMGM) corresponding to video data and audio data relating to the video data, and a video title set (VTS <1>) managed by video manager information (VMGI) of the VMG. In the VTS <1>, video data and audio data relating to the video data are arranged.

The DVD-Audio data recorded at the audio format comprises an audio manager (AMG) shown in FIG. 1B, an audio manager menu (AMGM) corresponding to video data and audio data relating to the video data, a first audio title set (ATS <1>) managed by audio manager information (AMGI) of the AMG and a second audio title set (ATS <2>) managed by the audio manager information (AMGI) of the AMG. In the ATS <1>, audio data is arranged, and contents of the audio data of the ATS <1> is the same as contents of the audio data of the VTS <1>. That is, the audio data is recorded not only at the video format but also at the audio format. In the ATS <2>, audio data is arranged, and contents of the audio data of the ATS <2> differs from contents of the audio data of the VTS <1>. The detail of the ATS <1> and ATS <2> is shown in FIG. 30.

Also, as shown in FIG. 30, the ATS <2> do not have any A-CONT pack, but the ATS <2> has A packs for each cell (or index).

In addition, a program executed in a computer is recorded in the DVD-ROM-Audio disc type 2 as a computer program title set (CTS).

In this embodiment, the VTS <1> is arranged in the DVD-ROM-Audio disc type 2. However, it is applicable that the VTS <1> be omitted from the DVD-ROM-Audio disc type 2.

Data recorded in a read-in area of the DVD-ROM-Audio disc type 2 is the same as that recorded in the DVD-Van disc according to the second embodiment except that a disc identifier indicating "DVD-ROM-Audio disc type 2" is recorded in the read-in area of the DVD-ROM-Audio disc type 2 as "book type, part version" of the physical format information (refer to FIG. 25). Therefore, data recorded in the DVD-ROM-Audio disc type 2 cannot be played back by using a DVD-video disc player, but can be played back by using a special disc player. However, because the TOC information is additionally recorded in an empty area of the copyright information of the control data block recorded in the read-in area which is adopted in the DVD-video disc, a simple playback can be performed. Also, pieces of TOC information are prepared in the order of arranging the Audio Titles (ATTS) in the same manner as in the second embodiment, so that the data recorded in the DVD-ROM-Audio disc type 2 can be efficiently managed. Also, in cases where a sampling frequency of the audio data or the number of quantization bits in the audio data is included in the TOC information for each track, a simple playback of the audio data can be easily performed by using the TOC information.

In the first to third embodiments, the TOC information is recorded in the read-in area. However, as shown in FIG. 31A, it is applicable that the TOC information be recorded in a management area such as AMG or ATSI of ATS or in a pack such as a CONT pack in the DVD-Van disc of the second embodiment or the DVD-ROM-Audio disc type of the third embodiment. Also, as shown in FIG. 31B, it is applicable that the TOC information is recorded in a management area such as AMG or ATSI of ATS or in a pack such as A pack in the DVD-Audio disc of the first embodiment, the DVD-Van disc of the second embodiment or the DVD-ROM-Audio disc type of the third embodiment.

Next, a signal encoding apparatus is described.

Figure 32:
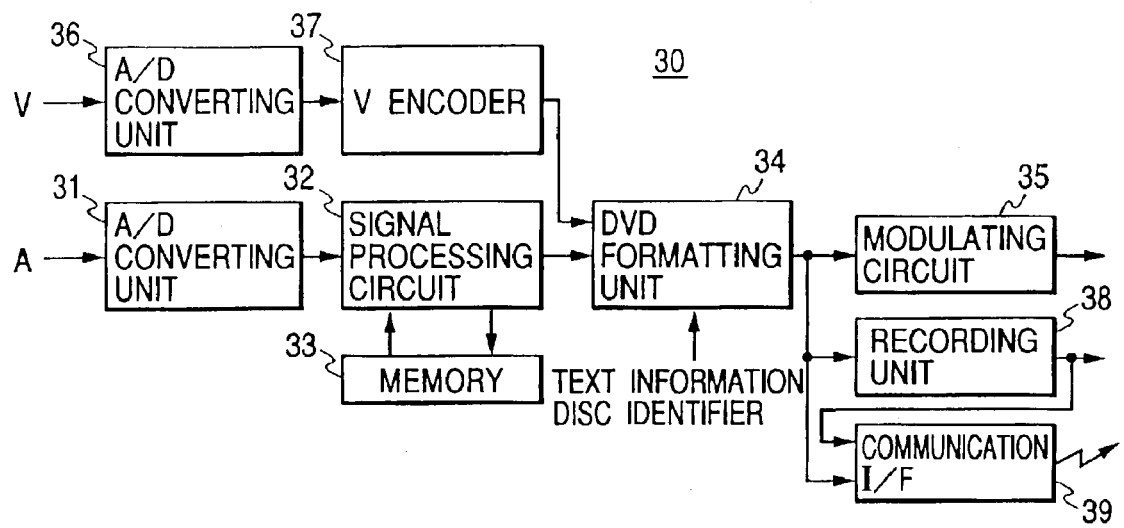
FIG. 32 is a block diagram of a signal encoding apparatus according to a fourth embodiment of the present invention.

FIG. 32 is a block diagram of a signal encoding apparatus according to a fourth embodiment of the present invention.

As shown in FIG. 32, in a signal encoding apparatus 30, an analog audio signal A is sampled in an A/D converting unit 31 at a high sampling frequency (corresponding to a sampling frequency $\Delta t$) such as 192 kHz, so that a PCM digital audio signal having a high resolution is produced from the analog audio signal. The PCM digital audio signal is composed of a series of PCM audio data (Xb1,X1,Xa1, X2,Xb2,X3,Xa2,--,Xbi,X2$i$-1,Xai,X2$i$,--) corresponding to a high resolution curved line α. Here, each piece of PCM audio data is, for example, expressed by 24 bits, and the symbol "i" is a positive integral number. Thereafter, the series of PCM audio data {Xbi,X2$i$-1,Xai,X2$i$} is encoded to user data in a signal processing circuit 32 and a memory 33 and is sent to a DVD formatting unit 34.

In detail, in the signal processing circuit 32, a frequency band of the series of PCM audio data {Xbi,X2$i$-1,Xai,X2$i$} is limited to half in a low pass filter such as a finite-duration impulse-response (FIR) filter. Therefore, a series of band limited audio data (Xc1,*,*,*,Xc2,*,*,*,Xc3,*,*,*,--,Xci,*, *,*,--) corresponding to a low resolution curved line β is produced as a band limited digital audio signal from the series of PCM audio data {Xbi,X2$i$-1,Xai,X2$i$}. Here, the symbol "*" denotes one piece of band limited audio data. The series of band limited audio data is temporarily stored in the memory 33.

Thereafter, the piece of data "*" are removed from the series of band limited audio data, and a series of sampling frequency reduced data $\{Xci\}=(Xc1,Xc2,Xc3,--,Xci,--)$ is produced as a sampling frequency reduced signal from the series of band limited audio data. The series of sampling frequency reduced data $\{Xci\}$ denotes a data series obtained by band-limiting the series of PCM audio data $\{Xbi,X2i-1, Xai,X2i\}$ and reducing the sampling frequency (192 kHz) to ¼. The series of sampling frequency reduced data $\{Xci\}$ is temporarily stored in the memory 33.

Also, the pieces of data Xi are removed from the PCM audio data $\{Xbi,X2i-1,Xai,X2i\}$, and a series of thinned-out audio data (Xb1,Xa1,Xb2,Xa2,--,Xbi,Xai, --) is produced as a thinned-out audio signal from the PCM audio data. The series of thinned-out audio data is temporarily stored in the memory 33.

Thereafter, a difference $\Delta 1i=Xbi-Xci$ and a difference $\Delta 2i=Xai-Xci$ are calculated, so that a series of differential audio data $\{\Delta 1i\}$ and a series of differential audio data $\{\Delta 2i\}$ are produced from the series of sampling frequency reduced data $\{xci\}$ and the series of thinned-out audio data $\{Xbi, Xai\}$. The differential audio data $\Delta 1i$ and $\Delta 2i$ can be respectively expressed by 24 bits (=3 bytes) or less, and the number of bits expressing each piece of differential data is set to a fixed value of 24 or is set to be variable.

Thereafter, the series of sampling frequency reduced data $\{Xci\}$, the series of differential audio data $\{\Delta 1i\}$ and the series of differential audio data $\{\Delta 2i\}$ are packed to produce a packet of user data $\{Xci,\Delta 1i,\Delta 2i\}$ (refer to FIG. 3) having 2034 bytes (1 packet=2034 bytes). The packet of user data $\{Xci,\Delta 1i,\Delta 2i\}$ is output to the DVD formatting unit 34.

Also, in cases where each piece of PCM audio data is expressed by 16 bits, it is applicable that the series of PCM audio data $\{Xbi,X2i-1,Xai,X2i\}$ be directly packed in the allocation circuit 40 to produce a packet of user data $\{Xbi,X2i-1,Xai,X2i\}$. In this case, the packet of user data $\{Xbi,X2i-1,Xai,X2i\}$ is output to the DVD formatting unit 34.

Also, an analog video signal V is converted into a digital video signal in an A/D converting unit 36, the digital video signal is encoded in a V encoder 37 to produce pieces encoded video data of the MPEG format, the pieces encoded video data are packed to produce a packet of user data shown in FIG. 3, and the packet of user data is sent to the DVD formatting unit 34.

In the DVD formatting unit 34, the packet of user data produced from the analog audio signal and the packet of user data produced from the analog video signal are packed with text information and a disc identifier in the format (refer to FIG. 1B and FIG. 31B) of the DVD-ROM-Audio disc according to the first embodiment, in the format (refer to FIG. 9A and FIG. 31A) of the DVD-ROM-Van disc according to the second embodiment or in the fundamental format (refer to FIG. 29 and FIG. 31B) of the DVD-ROM-Audio disc type 2 according to the third embodiment.

Thereafter, in a first audio data recording method, the data formatted in the DVD formatting unit 34 are modulated in a modulating circuit 35 according to a modulation method corresponding to the disc (the DVD-ROM-Audio disc according to the first embodiment, the DVD-ROM-Van disc according to the second embodiment or the DVD-ROM-Audio disc type 2 according to the third embodiment) to produce pieces of modulated data, and the pieces of modulated data are recorded in the disc.

Also, in a second audio data recording method, the data formatted in the DVD formatting unit 34 are recorded in an intermediate recording medium in a recording unit 38. Thereafter, in an audio data transmitting method, the intermediate recording medium is handed over to a human editor such as a recording producer or an engineer. In another audio data transmitting method, the data recorded in the intermediate recording medium is transmitted to a terminal of the editor through a communication interface (I/F) 39. Thereafter, the editor modulates the data recorded in the intermediate recording medium according to a modulation method corresponding to the disc, and pieces of modulated data are recorded in the disc(the DVD-ROM-Audio disc, the DVD-ROM-Van disc or the DVD-ROM-Audio disc type 2).

Also, in a third audio data recording method, the data formatted in the DVD formatting unit 34 are directly transmitted to the terminal of the editor through the communication interface (I/F) 39, the editor modulates the data according to a modulation method corresponding to the disc, and pieces of modulated data are recorded in the disc (the DVD-ROM-Audio disc, the DVD-ROM-Van disc or the DVD-ROM-Audio disc type 2).

Figure 33:
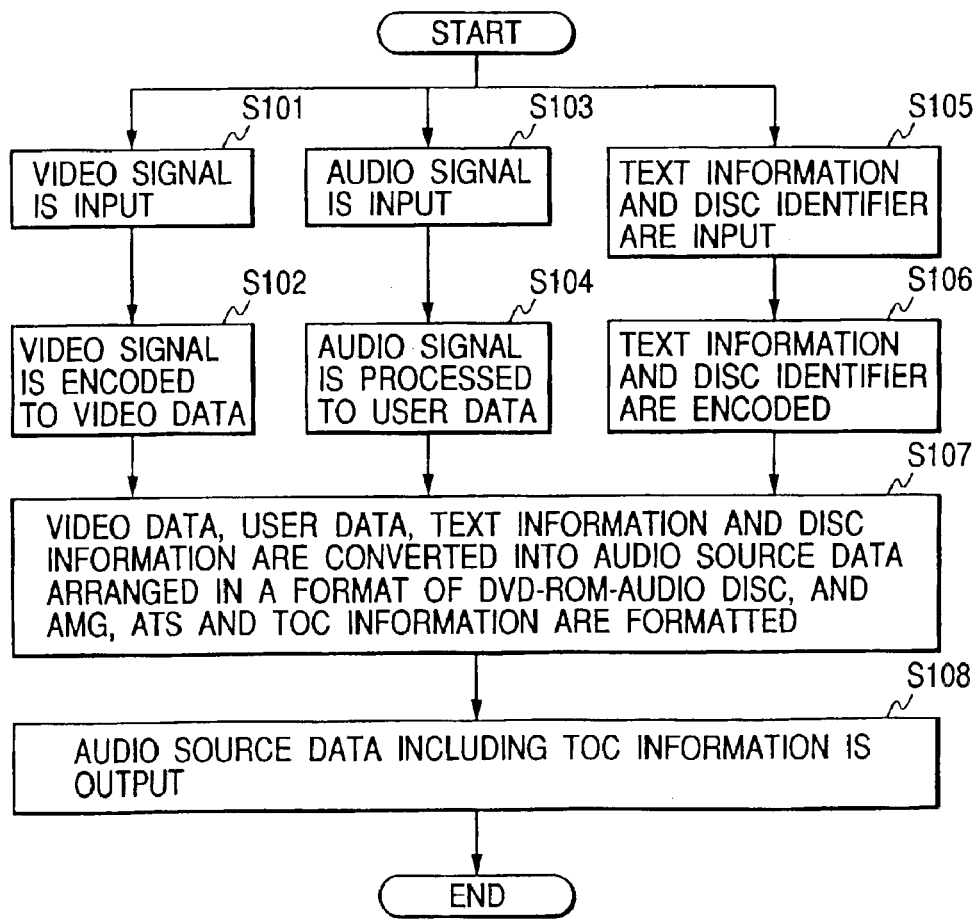
FIG. 33 is a flow chart showing a data encoding method performed in the signal encoding apparatus shown in FIG. 32.

FIG. 33 is a flow chart showing a data encoding method performed in the signal encoding apparatus 30.

As shown in FIG. 33, the video signal V is input to the A/D converting unit 36 (step S101) and is encoded to video data in the V encoder 37 (step S102). Also, the audio signal A is input to the A/D converting unit 31 (step S103) and is processed to user data in the signal processing unit 32 (step S104). Also, text information and a disc identifier are input (step S105) and are encoded (step S106).

Thereafter, the video data, the user data of the audio signal A, the text information and the disc identifier encoded in the steps S102, S104 and S106 are converted into audio source data arranged in a format corresponding to the DVD-ROM-Audio disc, the DVD-ROM-Van disc or the DVD-ROM-Audio disc type 2 (step S107) in the DVD formatting unit 34. That is, a plurality of audio title sets (ATSs) are produced from the audio data and the video data, an audio manager (AMG) is automatically produced, TOC information is automatically produced, and the AMG, the ATSs and the TOC information are formatted. Thereafter, the audio source data including the TOC information is output to a terminal of a human editor (step S108).

Figure 34:
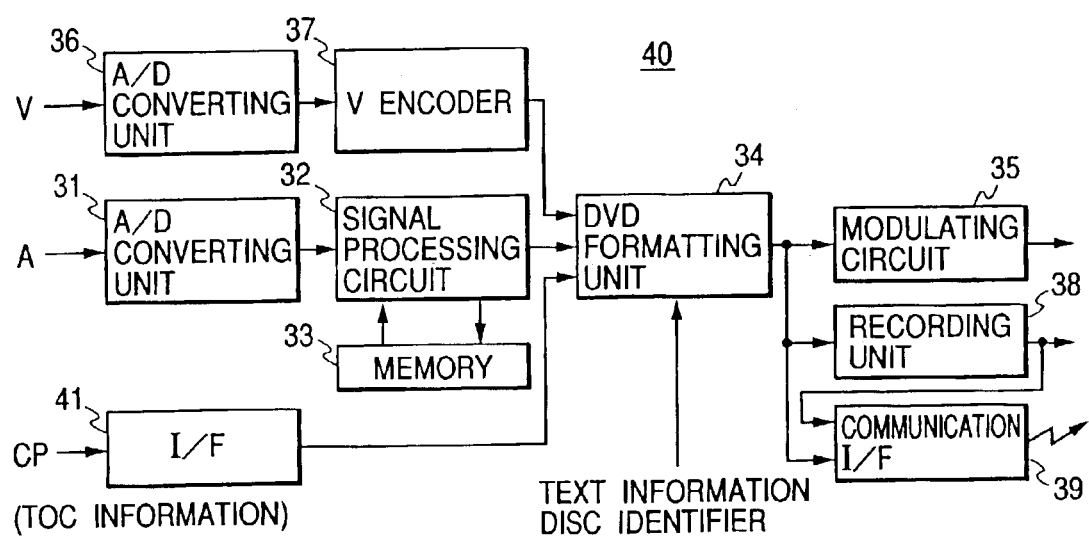
FIG. 34 is a block diagram of a signal encoding apparatus according to a modification of the fourth embodiment of the present invention.

FIG. 34 is a block diagram of another signal encoding apparatus according to the fourth embodiment of the present invention.

As shown in FIG. 34, in a signal encoding apparatus 40, a computer decoding program CP required to decode the video data, the user data of the audio signal A (that is, the audio data), the text information and the disc identifier encoded in the V encoder 37 and the signal processing circuit 32 is input to an interface (I/F) 41. For example, the computer decoding program CP is arranged in an area of a computer program title set (CTS) shown in FIG. 29. Also, it is applicable that a computer encoding program used to encode the video signal V, the audio signal A, the text information and the disc identifier be additionally input to the interface 41.

Figure 35:
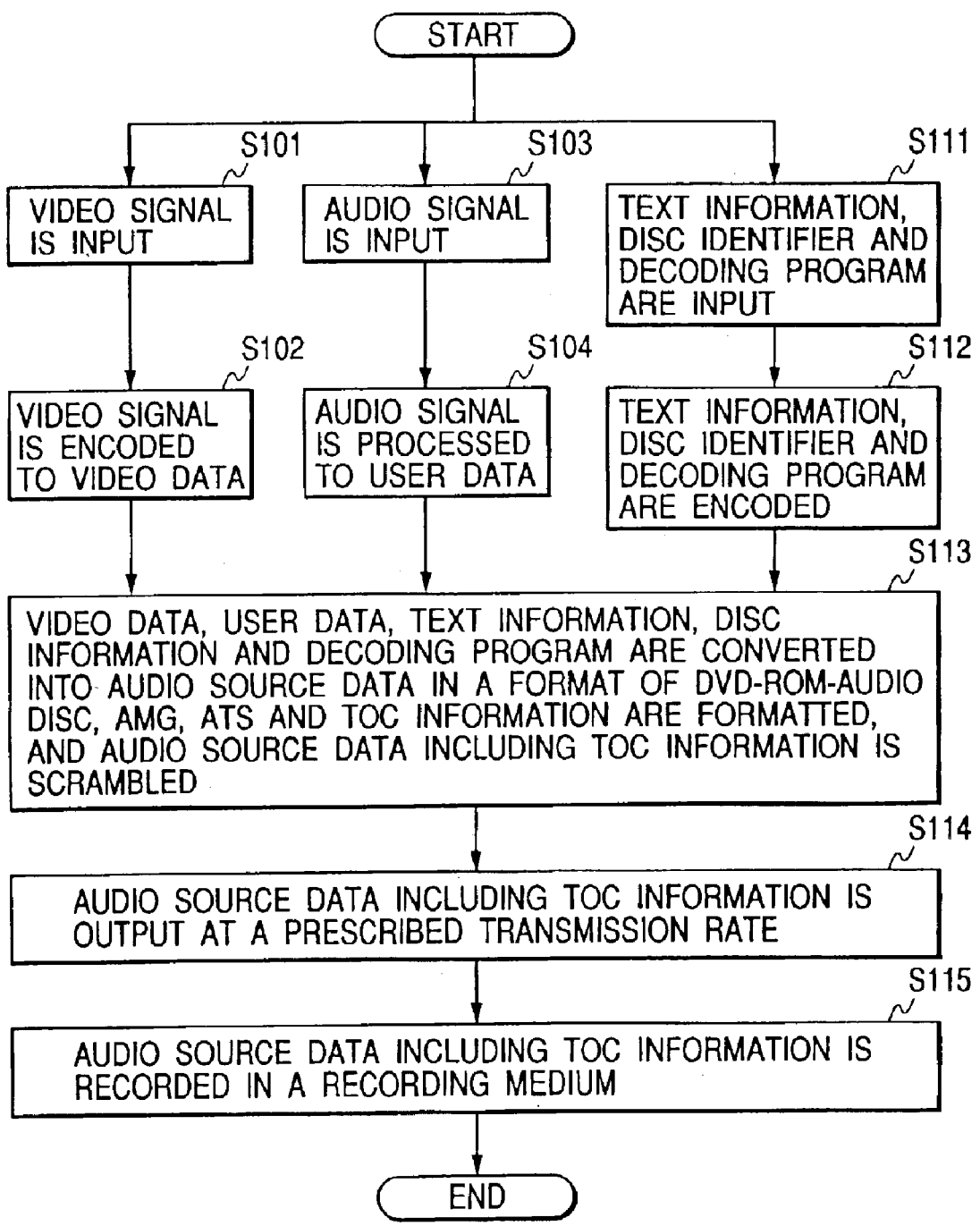
FIG. 35 is a flow chart showing a data encoding method performed in the signal encoding apparatus shown in FIG. 34.

FIG. 35 is a flow chart showing a data encoding method performed in the signal encoding apparatus 40.

As shown in FIG. 35, the computer decoding program CP is input with the text information and the disc identifier (step S111) and are encoded (step S112). Thereafter, the video data, the user data of the audio signal A, the computer decoding program CP, the text information and the disc identifier encoded in the steps S102, S104 and S112 are converted into audio source data arranged in a format corresponding to the DVD-ROM-Audio disc, the DVD-ROM-Van disc or the DVD-ROM-Audio disc type 2 in the DVD formatting unit 34, and a prescribed scrambling processing is performed for the formatted audio source data (step S113). That is, a plurality of audio title sets (ATSs) are produced from the audio data and the video data, an audio manager (AMG) is automatically produced, TOC information is automatically produced, and the AMG, the ATSs and the TOC information are formatted. Thereafter, the scrambled audio source data including the TOC information is output at a prescribed transmission rate (step S114) and is recorded in a recording medium (step S115). The scrambled audio source data recorded in the recording medium is transmitted to the terminal of the human editor.

In this embodiment, the TOC information is automatically produced in the DVD formatting unit 34. However, it is applicable that a part of TOC information be input to the DVD formatting unit 34 through the interface (I/F) 41 with the computer decoding program CP.

Figure 36:
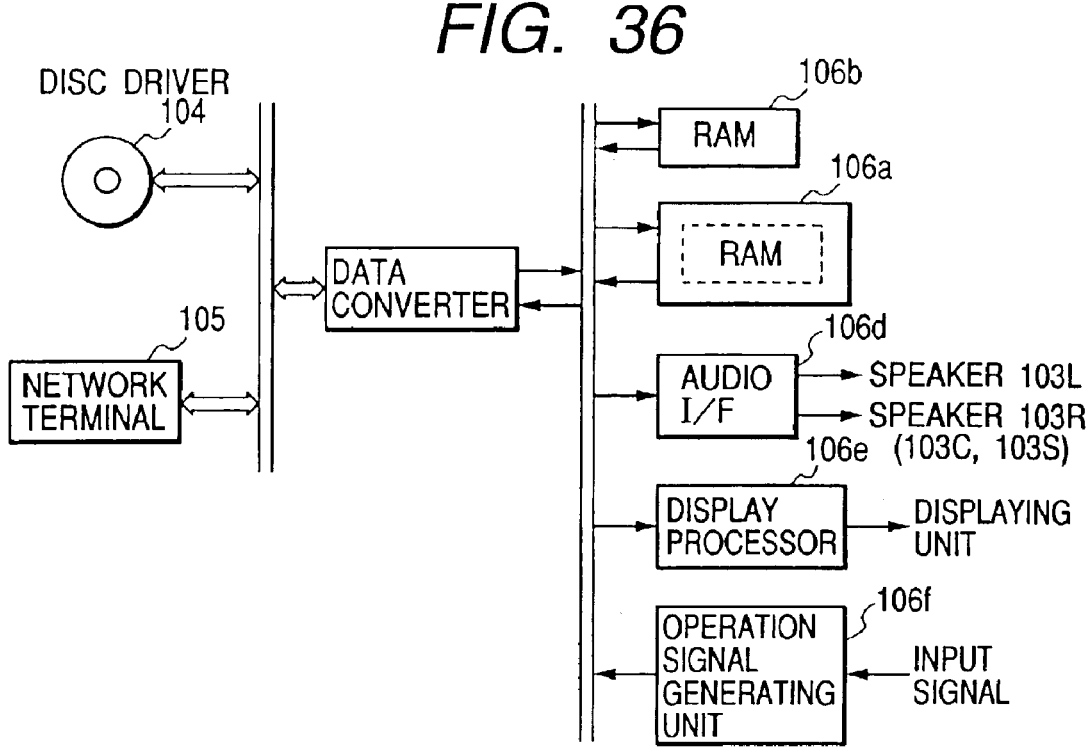
FIG. 36 is a block diagram of a personal computer of a data receiving side (or a human editor side) to which audio source (audio data and video data) and a decoding program prepared according to one of the first to third embodiments are transmitted from a data transmitting side (or an encoding apparatus side)
Figure 37:
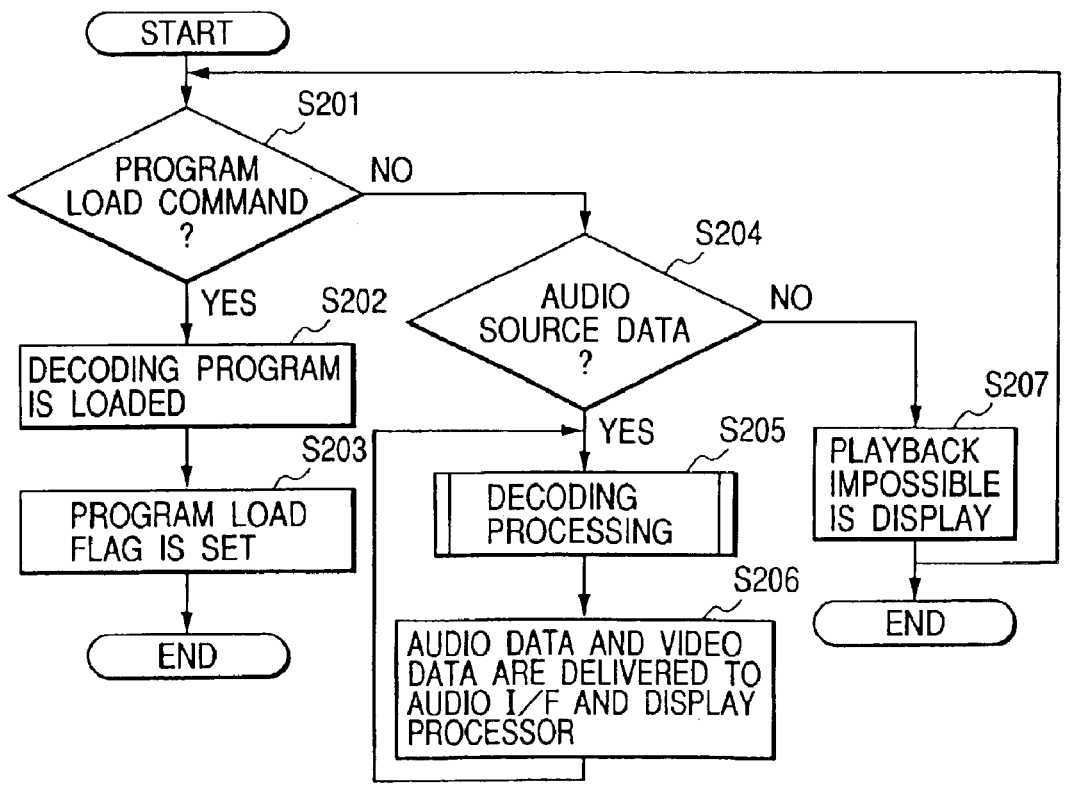
FIG. 37 is a flow chart showing a processing performed in the personal computer shown in FIG. 36.

FIG. 36 is a block diagram of a personal computer of a data receiving side (or a human editor side) to which audio source data (audio data and video data) and a computer decoding program CP prepared according to one of the first to third embodiments are transmitted from a data transmitting side (or an encoding apparatus side), and FIG. 37 is a flow chart showing a processing performed in the personal computer.

As shown in FIG. 36, the audio source data and the computer decoding program CP recorded in the recording medium are read out by using a disc driver 104, or the audio source data and the computer decoding program CP output from the signal encoding apparatus 30 are transmitted to a personal computer 106 of the human editor through a network terminal 105. Thereafter, the audio source data and the computer decoding program CP are decoded and played back in the personal computer 106.

The personal computer 106 comprises a central processing unit (CPU) 106a having a set of instructions (for example, an extended instruction set (MMX) of PP55C of Intel Co., LTD.) prepared for a special use to efficiently process a digital video signal and a digital audio signal, a random access memory (RAM) 106b used as a buffer in a data processing operation, a data converter 106c for converting the audio source data which is read out from a disc by using the disc driver 104 or is transmitted through the network terminal 105, an audio interface (I/F) 106d for supplying the audio source data processed in the data converter 106c to a plurality of speakers 103L and 103R (in addition, a speaker 103C and a speaker 103S for a surround effect) through a D/A converter and an amplifier (not shown), a display processor 106e for performing a display control for a display unit (not shown), and an operation signal generating unit 106f for generating an operation signal according to an input signal input from a mouse or a keyboard (not shown) by an operator.

In the above configuration, an operation of the personal computer 106 is described with reference to FIG. 37.

FIG. 37 is a flow chart showing a data encoding method performed in the personal computer 106.

As shown in FIG. 37, the CPU 106a is set to a condition for receiving a computer decoding program. Therefore, when a program load command is input to the operation signal generating unit 106f through a keyboard (step S201), a computer decoding program CP read out from a disc by using the disc driver 104 or transmitted from a data transmitting side through the network terminal 105 is loaded in the data converter 106c (step S202) and is stored in the RAM 106b. After the completion of the loading of the computer decoding program CP, a program load flag is set (step S203), and the CPU 106a is set to a condition for receiving audio source data. Because an extended instruction set (MMX) can be processed in the CPU 106a, a high speed signal processing can be performed in the CPU 106a.

Also, when a play command is input to the operation signal generating unit 106f through the keyboard, the personal computer 106 accesses to a first track of a disc (the DVD-ROM-Audio disc, the DVD-ROM-Van disc or the DVD-ROM-Audio disc type 2) of a data transmitting side, a disc identifier indicating a type of the disc is read out, and it is checked in the CPU 106a whether or not the disc identifier indicates "audio source data" (step S204). In cases where the disc identifier indicates "audio source data", audio source data is read out from the disc, a decoding processing is performed for the audio source data according to the computer decoding program CP in the CPU 106a to obtain audio data (or an audio signal) and video data (or a video signal) (step S205), and the audio data and the video data are delivered to the audio I/F 106d and the display processor 106e (step S206). The step S205 and the step S206 are performed for each predetermined volume of audio source data, the audio data is played back by the speakers 103L and 103R, and an image indicated by the video data is displayed on a display unit.

In contrast, in cases where the disc identifier does not indicate "audio source data", a message "playback impossible" is displayed on a display unit (step S207). Also, if required, an encoding processing is performed.

Therefore, a human editor can edit an audio signal transmitted from the data transmitting side through a recording medium or a communication medium.

Next, the transmission of the computer decoding program CP and the audio source data from the data transmitting side to the data receiving side is described in detail.

Figure 38:
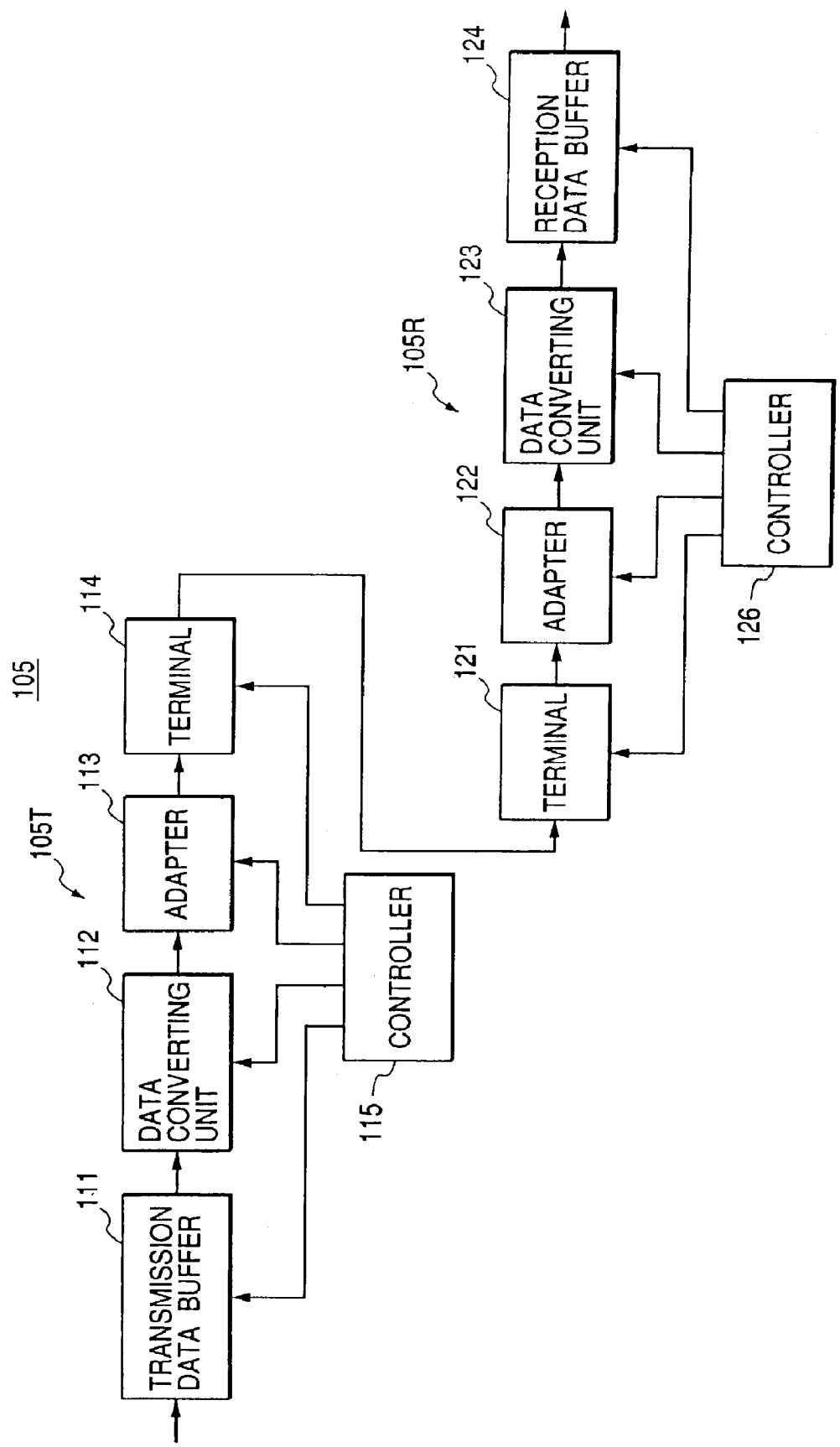
FIG. 38 is a block diagram of a network terminal shown in FIG. 36.

FIG. 38 is a block diagram of the network terminal 105.

As shown in FIG. 38, the network terminal 105 is composed of a transmission terminal 105T arranged on the data transmitting side, a reception terminal 105R arranged on the data receiving side and a network NW. The transmission terminal 105T comprises a transmission data buffer 111 for temporarily storing transmission data (for example, the audio source data and the computer decoding program CP), a data converting unit 112 for converting the transmission data into pieces of packet data, an adapter 113, a terminal 114, and a controller 115 for controlling the transmission data buffer 111, the data converting unit 112, the adapter 113 and the terminal 114. The reception terminal 105R comprises a terminal 121, an adapter 122, a data converting unit 123 for converting the pieces of packet data into reception data (for example, the audio source data and the computer decoding program CP), a reception data buffer 124, connected with an internal bus of the personal computer 106, for temporarily storing the transmission data, and a controller 125 for controlling the terminal 121, the adapter 122, the data converting unit 123 and the reception data buffer 124.

Figure 39:
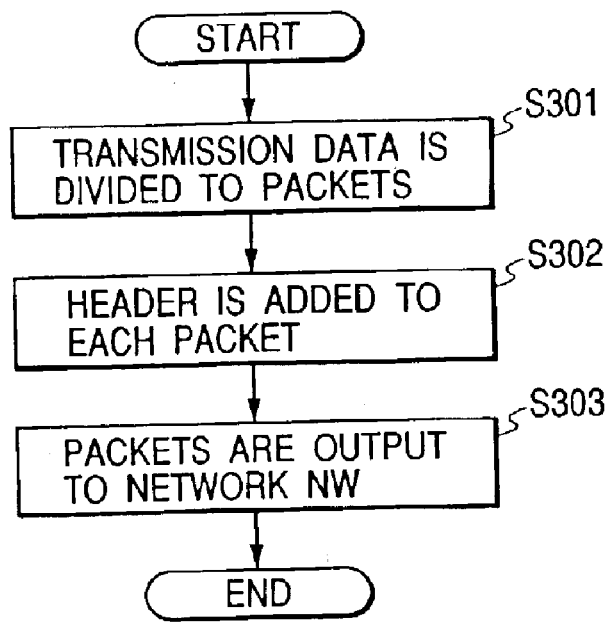
FIG. 39 is a flow chart showing a processing performed in a data converting unit of a transmission terminal shown in FIG. 38.

In the above configuration, an operation performed in the data converting unit 112 of the transmission terminal 105T and an operation performed in the data converting unit 123 of the reception terminal 105R are described. FIG. 39 is a flow chart showing a processing performed in the data converting unit 112 of the transmission terminal 105T, FIG. 40 is a flow chart showing a processing performed in the data converting unit 123 of the reception terminal 105R, FIG. 41A shows a processing for producing a series of packets from transmission data, and FIG. 41B shows a processing for reproducing reception data from the series of packets.

Figure 41A:
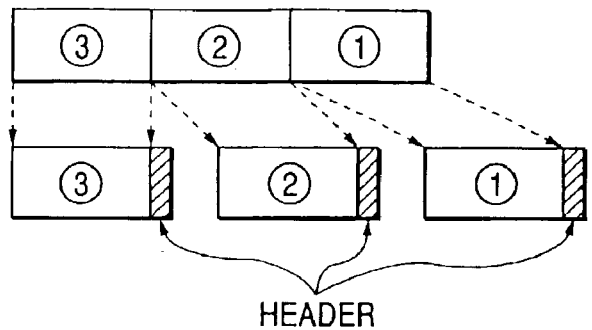
FIG. 41A shows a processing performed in a data converting unit of a transmission terminal shown in FIG. 38.

As shown in FIG. 39 and FIG. 41A, the data converting unit 112 divides the transmission data stored in the transmission data buffer 111 into pieces of data having the same data length to transmit the pieces of data as a series of packets (step S301). Thereafter, a header including an address of the reception terminal 105R is arranged at the top position of each packet (step S302), and the series of packets is output to the network NW through the adapter 113 and the terminal 114 (step S303).

Figure 40:
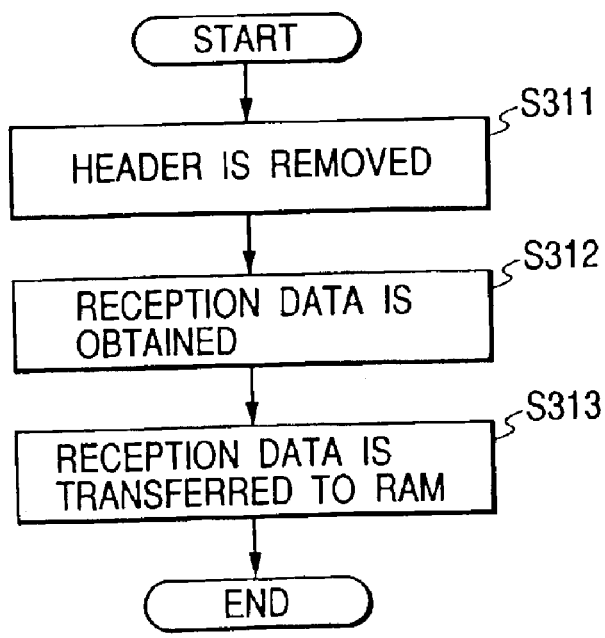
FIG. 40 is a flow chart showing a processing performed in a data converting unit of a reception terminal shown in FIG. 38.
Figure 41B:
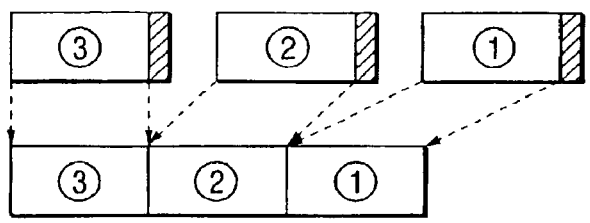
FIG. 41B shows a processing performed in a data converting unit of a reception terminal shown in FIG. 38.

As shown in FIG. 40 and FIG. 41B, the header is removed in the data converting unit 112 from each packet received through the terminal 121 and the adapter 122 (step S311), and reception data is obtained by reproducing the data from the series of packets (step S312), and the reception data is transferred to the RAM 106b through the reception data buffer 124 (step S313).

Figure 42:
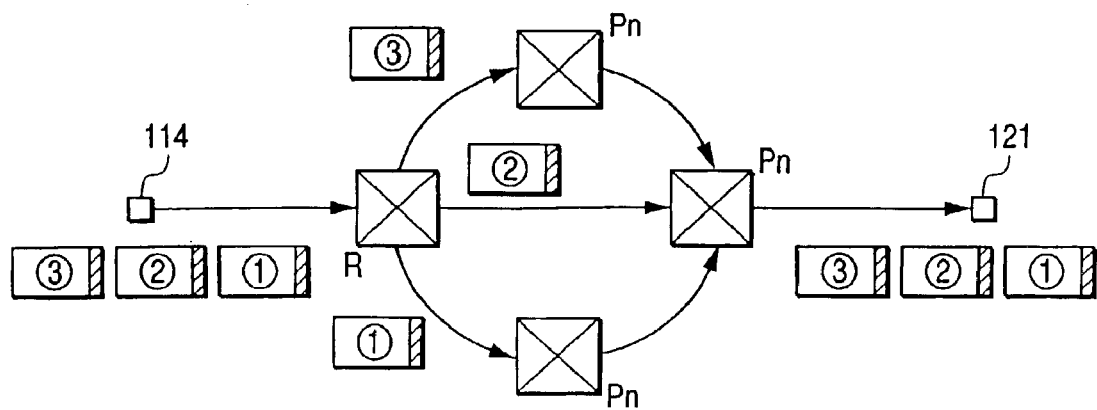
FIG. 42 shows the selection of an optimum route performed in the network NW shown in FIG. 38.

FIG. 42 shows the selection of an optimum route performed in the network NW.

The terminals 114 and 121 are connected with each other through the network NW. Each piece of packet data is transmitted through a cable television (CATV) circuit representing the network NW or is transmitted through an internet representing the network NW according to a Transmission Control Protocol/Internet Protocol (TCP/IP). In the network NW, as shown in FIG. 42, an optimum route is selected by a router R for each packet, the packets are separated, the packets pass through a plurality of packet switching units Pn corresponding to the packets and are transmitted to the personal computer 106 in series.

Accordingly, the audio source data transmitted from the data transmitting side can be decoded in the personal computer 106 of the data receiving side according to the computer decoding program CP transmitted from the data transmitting side.

Next, a fifth embodiment is described with reference to FIG. 43.

Figure 43:
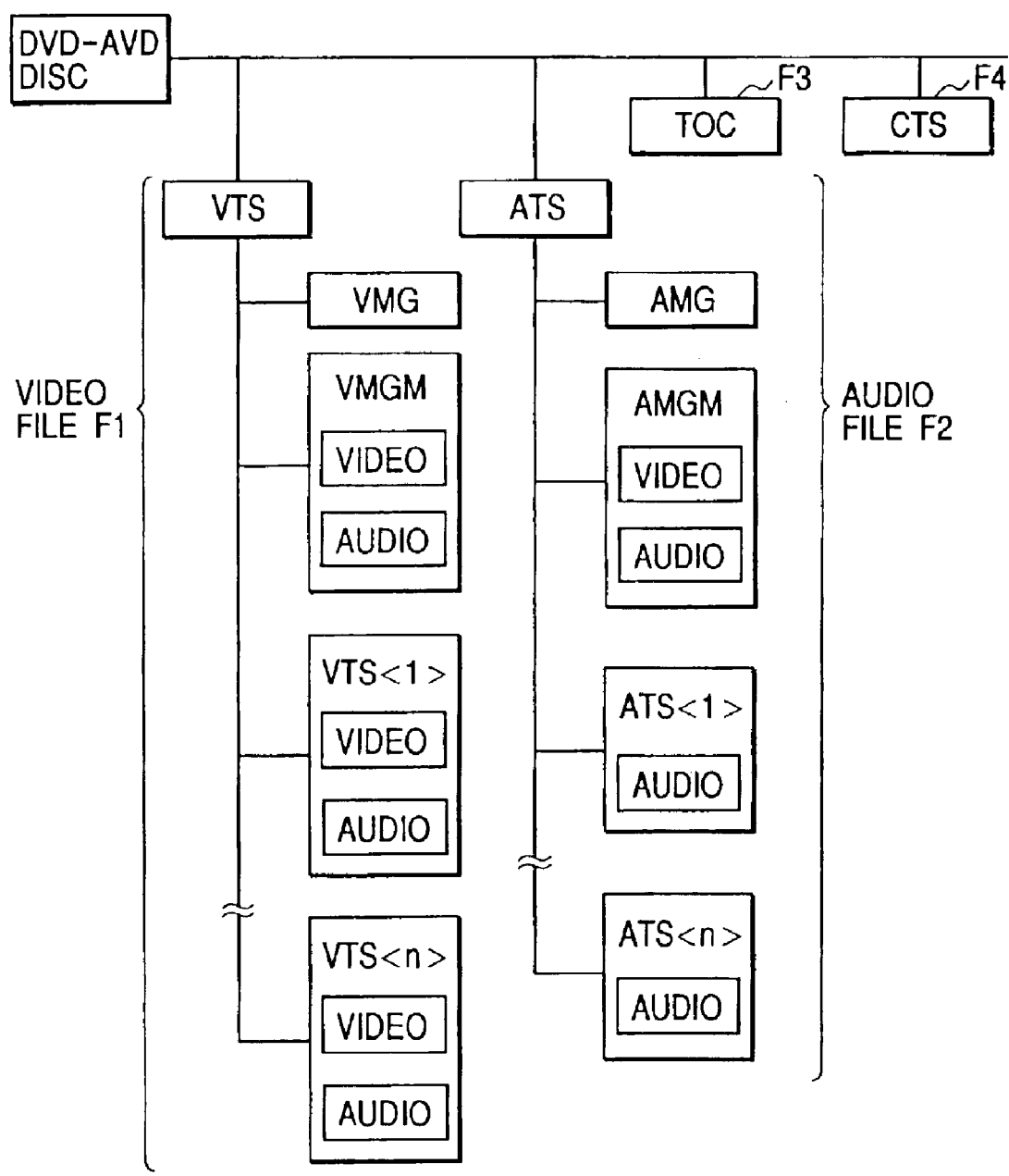
FIG. 43 shows a fundamental format of data recorded in a DVD-Avd (audio-video data) disc according to a fifth embodiment of the present invention.

FIG. 43 shows a fundamental format of data recorded in a DVD-Avd (audio-video data) disc according-to a fifth embodiment of the present invention.

As shown in FIG. 43, a format of data to be recorded in a DVD-Avd (audio-video data) disc belonging to one type of DVD-Audio disc comprises a video file F1 in which data to be reproduced by using a DVD-video disc player is arranged, an audio file F2 in which data to be played back by using a DVD-Audio disc player is arranged, a table-of-contents (TOC) file F3 in which TOC information described in FIG. 26A, FIG. 27A, FIG. 27B and FIG. 28 or in FIG. 26B, FIG. 27A, FIG. 27C and FIG. 28 is arranged, and a computer program title set (CTS) file F4 in which a program executed by a computer is arranged.

The video file F1 classified as a video title set (VTS) shown in FIG. 1A and FIG. 9A comprises a video manager (VMG), a video manager menu (VMGM) and video title sets VTS<1> to VTS<n>. In the VMGM, video data and audio data relating to the video data are arranged. Also, in each of the VTS<1> to VTS <n>, video data and audio data relating to the video data are arranged.

The audio file F2 classified as an audio title set (ATS) shown in FIG. 1B comprises an audio manager (AMG), an audio manager menu (AMGM) and audio title sets ATS<1> to ATS<n>. In the AMGM, video data and audio data are arranged. Contents of the video data in the AMGM differs from contents of the video data in the VMGM, and contents of the audio data in the AMGM differs from contents of the audio data in the VMGM. In each of the ATS<1> to ATS<n>, audio data is arranged. Contents of the audio data in each of the ATS<1> to ATS<n>differs from contents of the audio data in each of the VTS<1> to VTS<n>.

The TOC information of the table-of-contents (TOC) file F3 indicates a top address of the audio data of the audio file F2, so that the top address of the audio data of the audio file F2 is specified according to the TOC information when a DVD-Audio disc player searches the audio file F2, and the audio data of the audio file F2 is played back from a top position of a musical composition indicated by the audio data.

Therefore, the video format of the video file F1 is the same as that shown in FIG. 1A, and the audio format of the audio file F2 is the same as that shown in FIG. 1B.

The video file F1 including the video data and the audio data, the audio file F2 including the audio data, the TOC file F3 including the TOC information and the computer program title set (CTS) file F4 are directly recorded in the DVD-Avd disc at the fundamental format shown in FIG. 43 or are transmitted to a human editor through a recording medium or a communication circuit. The files transmitted to the human editor are recorded in the DVD-Avd disc at the fundamental format shown in FIG. 43.

Accordingly, because the video file F1 including the video data and the audio data, the audio file F2 including the audio data and the TOC file F3 including the TOC information are recorded in the DVD-Avd disc at the fundamental format shown in FIG. 43, in cases where a DVD-video disc player is used to play back the data recorded in the DVD-Avd disc, the video data and the audio data of the video file F1 can be played back. Also, in cases where a DVD-Audio disc player is used to play back the data recorded in the DVD-Avd disc, the audio data of the audio file F2 can be played back while playing back the audio data from a top position of a musical composition indicated by the audio data according to the TOC information. Also, the contents of the audio data played back by the DVD-Audio disc player differ from the contents of the audio data played back by the DVD-video disc player.

In this embodiment, audio data recorded in the DVD-Avd disc is played back at multi-channels such as six channels. In cases where the playback of the audio data at two channels is desired, a mix-down coefficient is required. To easily play back the audio data at two channels, the mix-down coefficient is recorded in the reserved area of one simple audio play pointer (SAPP) shown in FIG. 27B, so that the mix-down coefficient is promptly read out.

Figure 44:
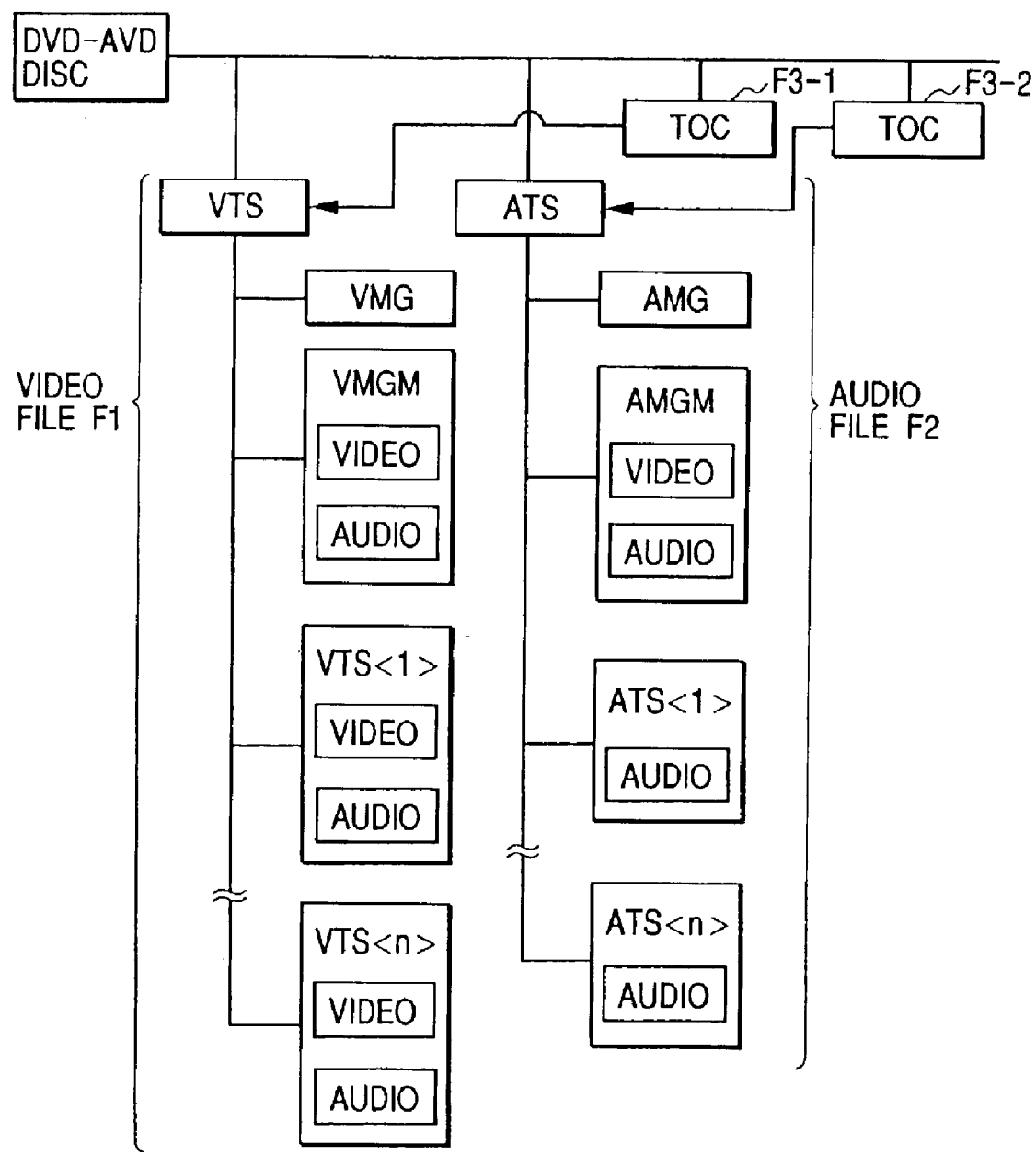
FIG. 44 shows a fundamental format of data recorded in a DVD-Avd (audio-video data) disc according to a modification of the fifth embodiment of the present invention.

FIG. 44 shows a fundamental format of data recorded in a DVD-Avd (audio-video data) disc according to a modification of the fifth embodiment of the present invention.

As shown in FIG. 44, a format of data to be recorded in a DVD-Avd (audio-video data) disc belonging to one type of DVD-Audio disc comprises the video file F1 in which data to be reproduced by using a DVD-video disc player is arranged, the audio file F2 in which data to be played back by using a DVD-Audio disc player is arranged, an audio table-of-contents (TOC) file F3-2 in which TOC information described in FIG. 26A, FIG. 27A, FIG. 27B and FIG. 28 or in FIG. 26B, FIG. 27A, FIG. 27C and FIG. 28 is arranged, and video TOC file F3-1 in which TOC information is arranged. The TOC information of the audio table-of-contents (TOC) file F3-2 indicates a top address of the audio data of the audio file F2, so that the top address of the audio data of the audio file F2 is specified according to the TOC information when a DVD-Audio disc player searches the audio file F2, and the audio data of the audio file F2 is played back from a top position of a musical composition indicated by the audio data. The TOC information of the video TOC file F3-1 indicates a top address of the video data of the video file F1 and a top address of the audio data of the video file F1, so that the video data and the audio data in the video file F1 are specified according to the TOC information of the video TOC file F3-1 when a DVD-video disc player searches the video file F1.

The video file F1 including the video data and the audio data, the audio file F2 including the audio data, the video TOC file F3-1 including the TOC information used for the video data and the audio TOC file F3-1 including the TOC information used for the audio data are directly recorded in the DVD-Avd disc at the fundamental format shown in FIG. 44 or are transmitted to a human editor through a recording medium or a communication circuit. The files transmitted to the human editor are recorded in the DVD-Avd disc at the fundamental format shown in FIG. 44.

Accordingly, because the audio data, the video data and the TOC information are recorded in the DVD-Avd disc according to the fundamental format shown in FIG. 43, in cases where a DVD-video disc player is used to reproduce the data recorded in the DVD-Avd disc, the video data and the audio data of the video file F1 can be reproduced while searching the video file F1 for the video data and the audio data of the video file F1 according to the TOC information of the TOC file F3-1. Also, in cases where a DVD-Audio disc player is used to play back the data recorded in the DVD-Avd disc, the audio data of the audio file F2 can be played back while playing back the audio data from a top position of a musical composition indicated by the audio data according to the TOC information of the TOC file F3-2. Also, the contents of the audio data played back by the DVD-Audio disc player differ from the contents of the audio data played back by the DVD-video disc player.

Figure 45:
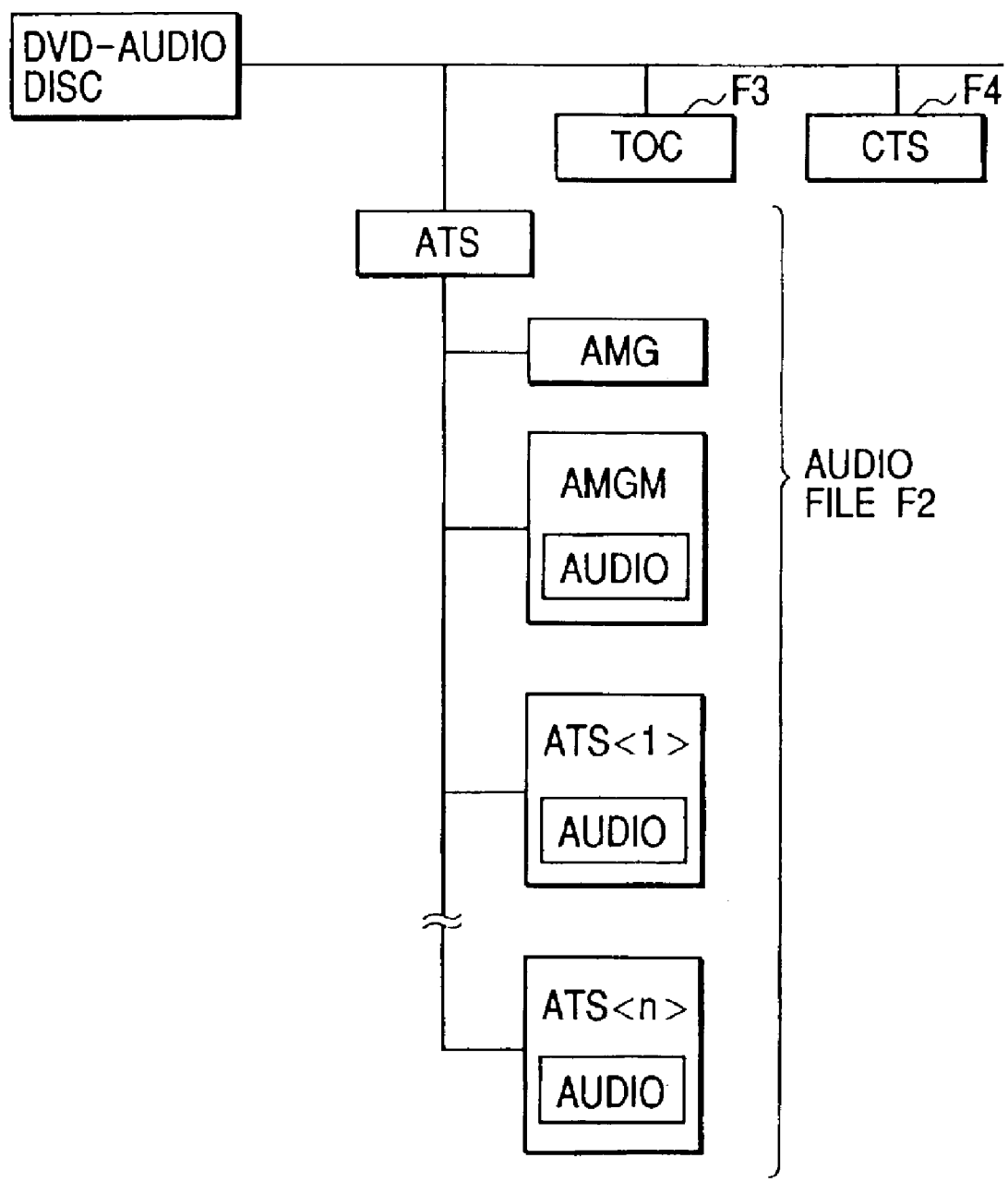
FIG. 45 shows a fundamental format of data recorded in a DVD-Audio disc according to a sixth embodiment of the present invention.

FIG. 45 shows a fundamental format of data recorded in a DVD-Audio disc according to a sixth embodiment of the present invention.

As shown in FIG. 45, a format of data to be recorded in a DVD-Audio disc comprises the audio file F2 in which data to be played back by using a DVD-Audio disc player is arranged, the table-of-contents (TOC) file F3 in which TOC information described in FIG. 26A, FIG. 27A, FIG. 27B and FIG. 28 or in FIG. 26B, FIG. 27A, FIG. 27C and FIG. 28 is arranged, and the computer program title set (CTS) file F4 in which a program executed by a computer is arranged. The TOC information is used to play back audio data of the audio file F2 from a top position of a musical composition indicated by the audio data.

The audio file F2 including the audio data, the TOC file F3 including the TOC information and the computer program title set (CTS) file F4 are directly recorded in the DVD-Audio disc at the fundamental format shown in FIG. 45 or are transmitted to a human editor through a recording medium or a communication circuit. The files transmitted to the human editor are recorded in the DVD-Audio disc at the fundamental format shown in FIG. 45.

Accordingly, because any video file F1 is not arranged in the DVD-Audio disc, though data recorded in the DVD-Audio disc cannot be played back by using a DVD-video disc player, in cases where a DVD-Audio disc player is used to play back the data recorded in the DVD-Audio disc, the audio data of the audio file F2 can be played back while playing back the audio data from a top position of a musical composition indicated by the audio data according to the TOC information.

In this embodiment, audio data recorded in the DVD-Audio disc is played back at multi-channels such as six channels. In cases where the playback of the audio data at two channels is desired, a mix-down coefficient is required. To easily play back the audio data at two channels, the mix-down coefficient is recorded in the reserved area of one simple audio play pointer (SAPP) shown in FIG. 27B, so that the mix-down coefficient is promptly read out.

Figure 46:
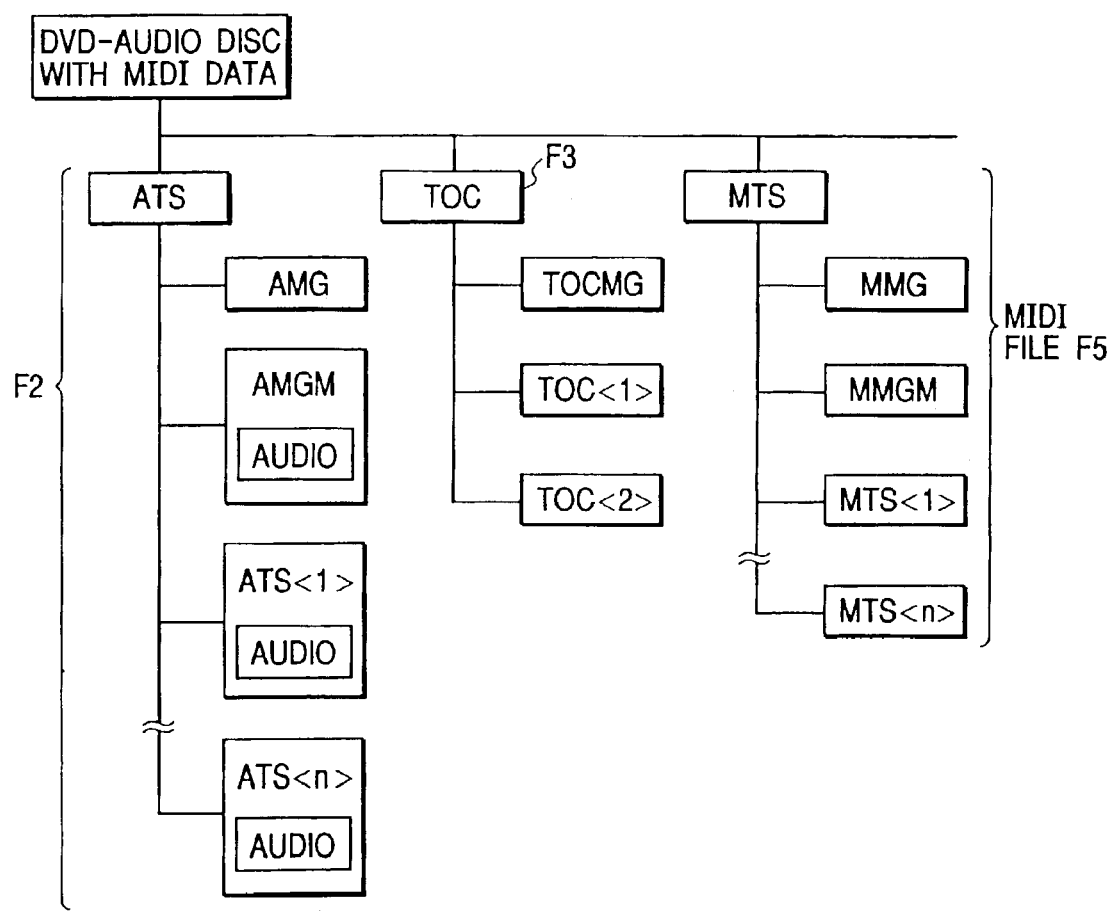
FIG. 46 shows a fundamental format of data recorded in a DVD-Audio disc with musical instrument digital interface (MIDI) data according to a seventh embodiment of the present invention.

FIG. 46 shows a fundamental format of data recorded in a DVD-Audio disc with musical instrument digital interface (MIDI) data according to a seventh embodiment of the present invention.

As shown in FIG. 46, a format of data to be recorded in a DVD-Audio disc with MIDI data comprises the audio file F2 in which data to be played back by using a DVD-Audio disc player is arranged, the table-of-contents (TOC) file F3 in which TOC information described in FIG. 26A, FIG. 27A, FIG. 27B and FIG. 28 or in FIG. 26B, FIG. 27A, FIG. 27C and FIG. 28 is arranged, and an MIDI file F5 in which MIDI data to be played back by using a personal computer with an MIDI sequencer is arranged. The TOC file F3 comprises a TOC manager (TOCMG), TOC<1> used for the audio file F2 and TOC<2> used for the MIDI file F5. The MIDI file F5 classified as an MIDI title set (MTS) comprises an MIDI manager (MMG), an MMG menu (MMGM) and MIDI title sets MTS<1> to MTS<n>. TOC information of the TOC<1> indicates a top address of the audio data of the audio file F2 to play back the audio data from a top position of a musical composition indicated by the audio data, and TOC information of the TOC<2> indicates a top address of audio data of the MIDI file F5, so that the top address of the MIDI data of the MIDI file F5 is specified according to the TOC information, and the MIDI data of the MIDI file F5 is played back from a top position of a musical composition (for example, a background music) indicated by the MIDI data.

The audio file F2 including the audio data, the MIDI file F5 including the MIDI data and the TOC file F3 including the TOC information are directly recorded in the DVD-Audio disc with MIDI data at the fundamental format shown in FIG. 46 or are transmitted to a human editor through a recording medium or a communication circuit. The files transmitted to the human editor are recorded in the DVD-Audio disc with MIDI data at the fundamental format shown in FIG. 46.

Accordingly, because any video file F1 is not arranged in the DVD-Audio disc with MIDI data, though data recorded in the DVD-Audio disc with MIDI data cannot be played back by using a DVD-video disc player, in cases where a DVD-Audio disc player is used to play back the data recorded in the DVD-Audio disc with MIDI data, the audio data of the audio file F2 can be played back while playing back the audio data from a top position of a musical composition indicated by the audio data according to the TOC information of the TOC<1>.

Also, in cases where a personal computer with an MIDI sequencer is used to play back the data recorded in the DVD-Audio disc with MIDI data, the MIDI data of the MIDI file F5 can be played back while playing back the MIDI data from a top position of a musical composition indicated by the MIDI data according to the TOC information of the TOC<2>.

Therefore, contents of the MIDI data of the MIDI file F5 can differ from contents of the audio data of the audio file F2. For example, audio data indicating an original song is arranged in the ATS<1> to ATS<n> of the audio file F2, and MIDI data indicating an accompaniment (or a background music) of the original song is arranged in the MTS<1> to MTS<n> of the MIDI file F5. In this case, users can entertain the original song with its accompaniment or its background music.

Figure 47:
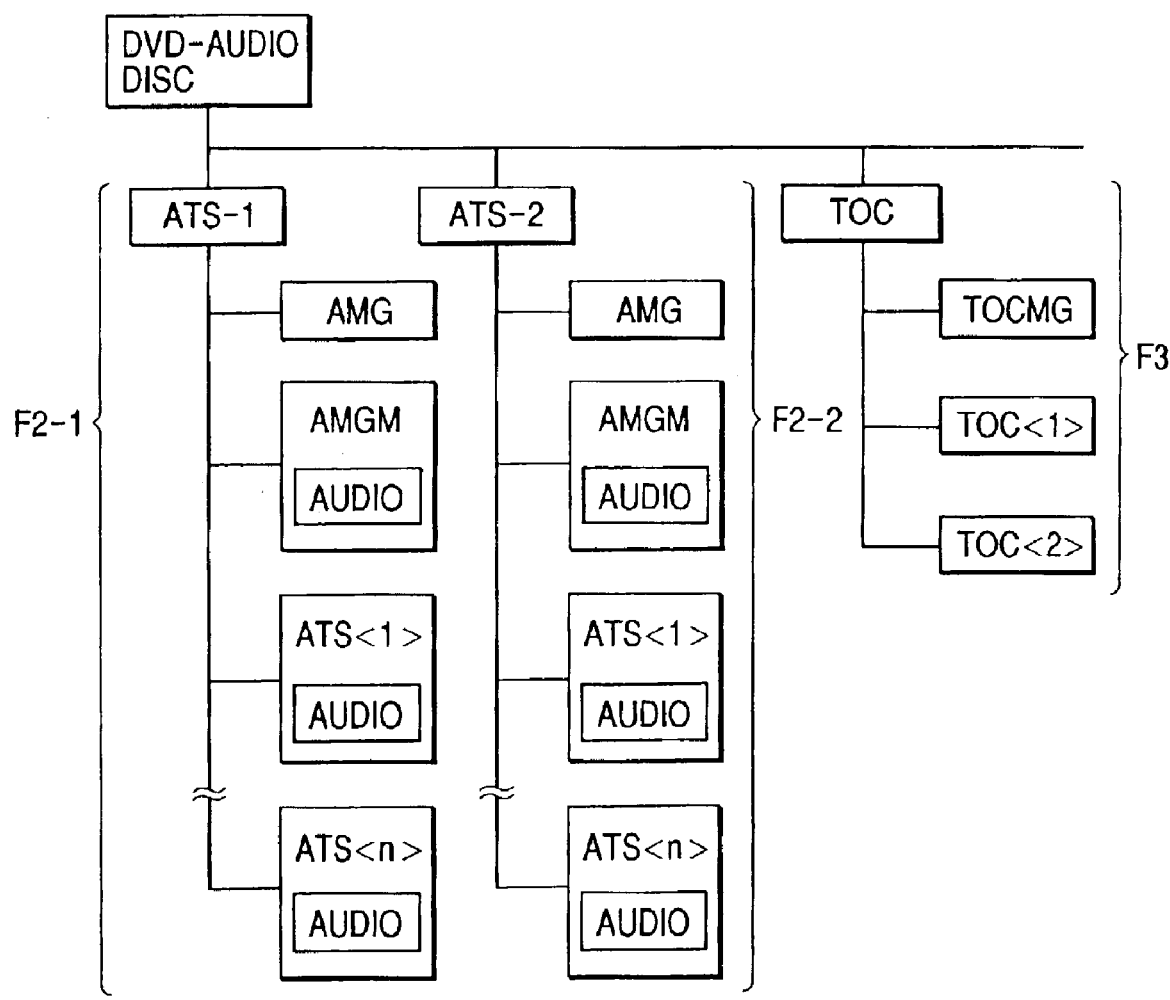
FIG. 47 shows a fundamental format of data recorded in a DVD-Audio disc according to an eighth embodiment of the present invention.

FIG. 47 shows a fundamental format of data recorded in a DVD-Audio disc according to an eighth embodiment of the present invention.

As shown in FIG. 47, a format of data recorded in a DVD-Audio disc comprises an audio file F2-1 in which data to be played back by using a DVD-Audio disc player is arranged, an audio file F2-2 in which data to be played back by using the DVD-Audio disc player is arranged, and the table-of-contents (TOC) file F3 in which TOC information described in FIG. 26A, FIG. 27A, FIG. 27B and FIG. 28 or in FIG. 26B, FIG. 27A, FIG. 27C and FIG. 28 is arranged. The TOC file F3 comprises a TOC manager (TOCMG), TOC<1> used for the audio file F2-1 and TOC<2> used for the audio file F2-2. The TOC information of the TOC<1> is used to play back audio data of the audio file F2-1 from a top position of a musical composition indicated by the audio data, and the TOC information of the TOC<2> is used to play back audio data of the audio file F2-2 from a top position of a musical composition indicated by the audio data.

The audio file F2-1 including the audio data, the audio file F2-2 including the audio data and the TOC file F3 including the TOC information are directly recorded in the DVD-Audio disc at the fundamental format shown in FIG. 47 or are transmitted to a human editor through a recording medium or a communication circuit. The files transmitted to the human editor are recorded in the DVD-Audio disc at the fundamental format shown in FIG. 47.

Accordingly, because any video file F1 is not arranged in the DVD-Audio disc, though data recorded in the DVD-Audio disc cannot be played back by using a DVD-video disc player, in cases where a DVD-Audio disc player is used to play back the data recorded in the DVD-Audio disc, the audio data of the audio file F2-1 can be played back while playing back the audio data from a top position of a musical composition indicated by the audio data according to the TOC information of the TOC<1>, and the audio data of the audio file F2-2 can be played back while playing back the audio data from a top position of a musical composition indicated by the audio data according to the TOC information of the TOC<2>.

Also, contents of the audio data of the audio file F2-1 can differ from contents of the audio data of the audio file F2-2. For example, a music source of a musical composition played by a music performer at a first performance style is recorded in the ATS<1> to ATS<n> of the audio file F2-1, and a music source of the musical composition played by the same music performer at a second performance style is recorded in the ATS<1> to ATS<n> of the audio file F2-2. Also, a music source of a musical composition played by a first music performer is recorded in the ATS<1> to ATS<n> of the audio file F2-1, and a music source of the musical composition played by a second music performer is recorded in the ATS<1> to ATS<n> of the audio file F2-2. In this case, users can entertain the musical composition at various performance styles.

Figure 48:
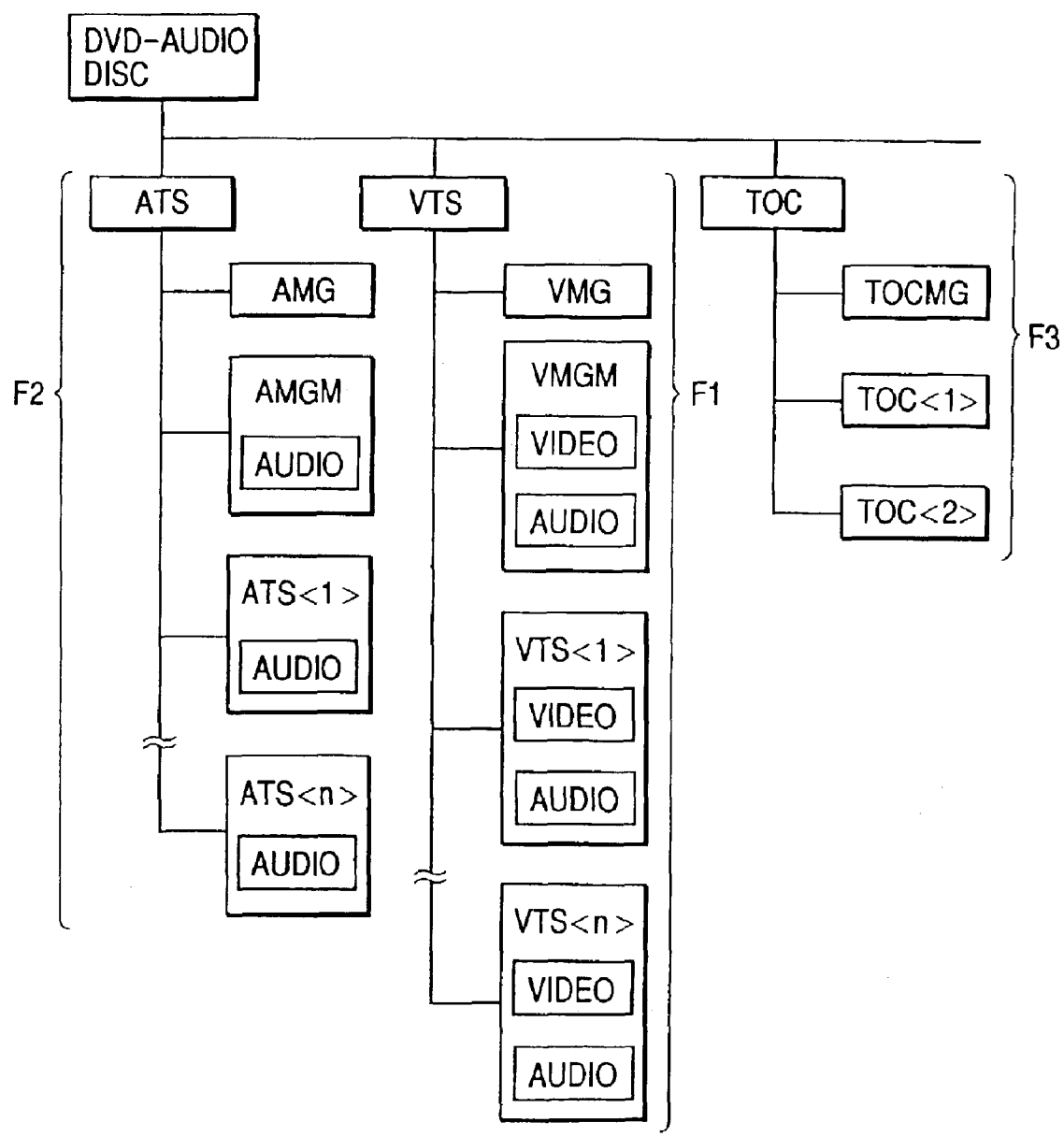
FIG. 48 shows a fundamental format of data recorded in a DVD-Audio disc according to a ninth embodiment of the present invention.

FIG. 48 shows a fundamental format of data recorded in a DVD-Audio disc according to a ninth embodiment of the present invention.

As shown in FIG. 48, a format of data to be recorded in a DVD-Audio disc comprises the video file F1 in which data to be reproduced by using a DVD-video disc player is arranged, the audio file F2 in which data to be played back by using a DVD-Audio disc player is arranged, and the table-of-contents (TOC) file F3 in which TOC information described in FIG. 26A, FIG. 27A, FIG. 27B and FIG. 28 or in FIG. 26B, FIG. 27A, FIG. 27C and FIG. 28 is arranged. The TOC file F3 comprises a TOC manager (TOCMG), TOC<1> used for the video file F1 and TOC<2> used for the audio file F2. TOC information of the TOC<1> indicates a top address of the video data and audio data of the video file F2 to reproduce the video data and audio data from a top position of picture and music indicated by the video data and audio data, and TOC information of the TOC<2> indicates a top address of the audio data of the audio file F2 to play back the audio data from a top position of a musical composition indicated by the audio data, so that the top address of the video and audio data of the video file F1 is specified according to the TOC information, and the audio data of the audio file F2 is played back from a top position of a musical composition indicated by the audio data.

The video file F1 including the video and audio data, the audio file F2 including the audio data and the TOC file F3 including the TOC information are directly recorded in the DVD-Audio disc at the fundamental format shown in FIG. 48 or are transmitted to a human editor through a recording medium or a communication circuit. The files transmitted to the human editor are recorded in the DVD-Audio disc at the fundamental format shown in FIG. 48.

Accordingly, in cases where a DVD-Video disc player is used to reproduce the video and audio data recorded in the DVD-Video disc, the video and audio data of the video file F1 can be reproduced according to the TOC information of the TOC<1>. Also, in cases where a DVD-Audio disc player is used to play back the audio data recorded in the DVD-Audio disc, the audio data of the audio file F2 can be played back while playing back the audio data from a top position of a musical composition indicated by the audio data according to the TOC information of the TOC<2>.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A signal encoding method, comprising the steps of:
   encoding a signal to produce audio data, audio manager information, audio manager menu data, audio title set information, and table-of-contents (TOC) information;
   formatting the audio data, the audio manager information, the audio manager menu data, the audio title set information, and the table-of-contents (TOC) information to arrange the audio data in an audio pack, to arrange the audio manager information in an area of an audio manager, to arrange the audio manager menu data in an area of an audio manager menu, to arrange the audio title set information in an area of an audio title set and to arrange the table-of-contents (TOC) information indicative of a position of the audio data in an area of a table-of-contents (TOC) file, said table-of-contents (TOC) file being independent of said the audio title set information, the table-of-contents (TOC) file containing an audio play pointer (SAPP) which has a start address of the audio data in the audio pack and attribute data of the audio pack, and the attribute data containing the number of quantization bits of the audio data for playing back a musical composition which contains the audio data; and outputting the audio data, the audio manager information, the audio manager menu data, the audio title set information, and the table-of-contents (TOC) information formatted in the formatting step.

2. A signal encoding method according to claim 1, in which the table-of-contents (TOC) information is divided into a plurality of TOC groups where a musical composition containing the audio data is played back by the respective group.

3. A signal decoding method, comprising the steps of:

deformatting audio data, audio manager information, the audio manager menu data, audio title set information, and table-of-contents (TOC) information indicative of a position of the audio data encoded by an encoding apparatus, including (1) signal encoding means for encoding the audio data, the audio manager information, the audio manager menu data, the audio title set information and the table-of-contents (TOC) information;

(2) formatting means for formatting the audio data, the audio manager information, the audio manager menu data, the audio title set information and the table-of-contents (TOC) information to arrange the audio data in an audio pack, to arrange the audio manager information in an area of an audio manager, to arrange the audio manager menu data in an area of an audio manager menu (AMGM), to arrange the audio title set information in an area of an audio title set and to arrange the table-of-contents (TOC) information indicative of a position of the audio data in a table-of-contents (TOC) file, the table-of-contents (TOC) file being independent of the audio title set information, the table-of-contents (TOC) file containing an audio play pointer (SAPP) which has a start address of the audio data in the audio pack and attribute data of the audio pack, the attribute data containing the number of guantization bits of the audio data for playing back a musical composition which contains the audio data; and (3) outputting means for outputting the audio data, the audio manager information, the audio manager menu data, the audio title set information, and the table-of-contents (TOC) information formatted by the formatting means; and outputting the audio data from a top position of a musical composition indicated by both the start address and the attribute data of the audio play pointer (SAPP) of the table-of-contents (TOC) file according to the table-of-contents (TOC) information.

\* \* \* \* \*